United States Patent
Bienkowski et al.

(10) Patent No.: US 9,047,411 B1
(45) Date of Patent: Jun. 2, 2015

(54) PROGRAMMING ENVIRONMENT FOR EXECUTING PROGRAM CODE DESPITE ERRORS AND FOR PROVIDING ERROR INDICATORS

(71) Applicant: The MathWorks, Inc., Natick, MA (US)

(72) Inventors: Joseph R. Bienkowski, Ashland, MA (US); Claudia G. Wey, Wayland, MA (US); Michelle D. Erickson, Watertown, MA (US); Benjamin V. Hinkle, Brookline, MA (US); Jared D. MacDonald, Cambridge, MA (US); John E. Booker, Jamaica Plain, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/068,263

(22) Filed: Oct. 31, 2013

Related U.S. Application Data

(63) Continuation-in-part of application No. 14/059,872, filed on Oct. 22, 2013.

(51) Int. Cl.
*G06F 9/44* (2006.01)
*G06F 11/36* (2006.01)

(52) U.S. Cl.
CPC .................. *G06F 11/3664* (2013.01)

(58) Field of Classification Search
USPC ................. 717/124–131, 140–141
IPC ................ G06F 11/30,11/36, 11/362, 11/3664, G06F 11/3668
See application file for complete search history.

(56) References Cited

U.S. PATENT DOCUMENTS

| | | | |
|---|---|---|---|
| 5,317,740 A * | 5/1994 | Sites | 717/129 |
| 5,339,428 A * | 8/1994 | Burmeister et al. | 717/146 |
| 5,758,061 A * | 5/1998 | Plum | 714/35 |
| 6,202,199 B1 * | 3/2001 | Wygodny et al. | 717/125 |
| 6,263,489 B1 * | 7/2001 | Olsen et al. | 717/129 |
| 6,282,701 B1 * | 8/2001 | Wygodny et al. | 717/125 |
| 6,915,509 B1 * | 7/2005 | Chkodrov et al. | 717/124 |
| 7,020,852 B2 * | 3/2006 | Oeltjen et al. | 716/136 |
| 7,058,928 B2 | 6/2006 | Wygodny et al. | |
| 7,146,613 B2 | 12/2006 | Chauvel et al. | |

(Continued)

OTHER PUBLICATIONS

Ficco et al, "Bug Localization in Test-Driven Development", Hindawi Publishing Corporation, Advances in Software Engineering, vol. 2011, Article ID 492757, pp. 1-18, 2011.*

(Continued)

*Primary Examiner* — Anil Khatri
(74) *Attorney, Agent, or Firm* — Harrity & Harrity, LLP

(57) ABSTRACT

A device may receive an indication to evaluate a first portion of program code and a second portion of program code provided via a user interface. The first portion of program code may include an error. The device may cause the first and second portions of program code to be evaluated based on receiving the indication to evaluate the first and second portions of program code. The second portion of program code may be evaluated after the first portion of program code. The device may generate a first result corresponding to the first portion of program code and a second result corresponding to the second portion of program code. The first result may include an error indicator. The device may provide the first result and the second result via the user interface.

20 Claims, 19 Drawing Sheets

(56) References Cited

U.S. PATENT DOCUMENTS

| | | | |
|---|---|---|---|
| 7,171,655 B2 * | 1/2007 | Gordon et al. | 717/146 |
| 7,343,588 B2 | 3/2008 | Bates et al. | |
| 7,669,188 B2 * | 2/2010 | Nickell et al. | 717/126 |
| 7,685,570 B2 * | 3/2010 | Draine et al. | 717/125 |
| 7,917,894 B2 * | 3/2011 | Chen et al. | 717/124 |
| 7,984,428 B1 * | 7/2011 | Seymour | 717/125 |
| 8,079,019 B2 * | 12/2011 | Lindo et al. | 717/129 |
| 8,104,021 B2 * | 1/2012 | Erlingsson et al. | 717/126 |
| 8,146,058 B2 | 3/2012 | Sarkar et al. | |
| 8,312,435 B2 * | 11/2012 | Wygodny et al. | 717/130 |
| 8,365,149 B2 * | 1/2013 | Frank et al. | 717/125 |
| 8,392,885 B2 * | 3/2013 | Stall et al. | 717/124 |
| 8,589,888 B2 * | 11/2013 | Cui et al. | 717/125 |
| 8,593,703 B2 | 11/2013 | Kort | |
| 8,656,351 B2 | 2/2014 | Kodosky et al. | |
| 8,689,188 B2 * | 4/2014 | Bassin et al. | 717/124 |
| 8,762,956 B1 * | 6/2014 | Simoneau et al. | 717/130 |
| 8,799,871 B2 | 8/2014 | Baker | |
| 8,863,085 B1 * | 10/2014 | Stahlberg | 717/124 |

OTHER PUBLICATIONS

Fontana et al, "Impact of Refactoring on Quality Code Evaluation", ACM, pp. 37-40, 2011.*

DiGiuseppe, "Automatically Describing Software Faults", ACM, pp. 711-714, 2013.*

Fontana et al, "Investigating the Impact of Code Smells Debt on Quality Code Evaluation ", IEEE, pp. 15-22, 2012.*

Co-pending U.S. Appl. No. 14/059,872, filed Oct. 22, 2013 entitled "A Program Code Interface For Providing Program Code and Corresponding Results of Evaluating the Program Code", Bienkowski et al., 120 pages.

* cited by examiner

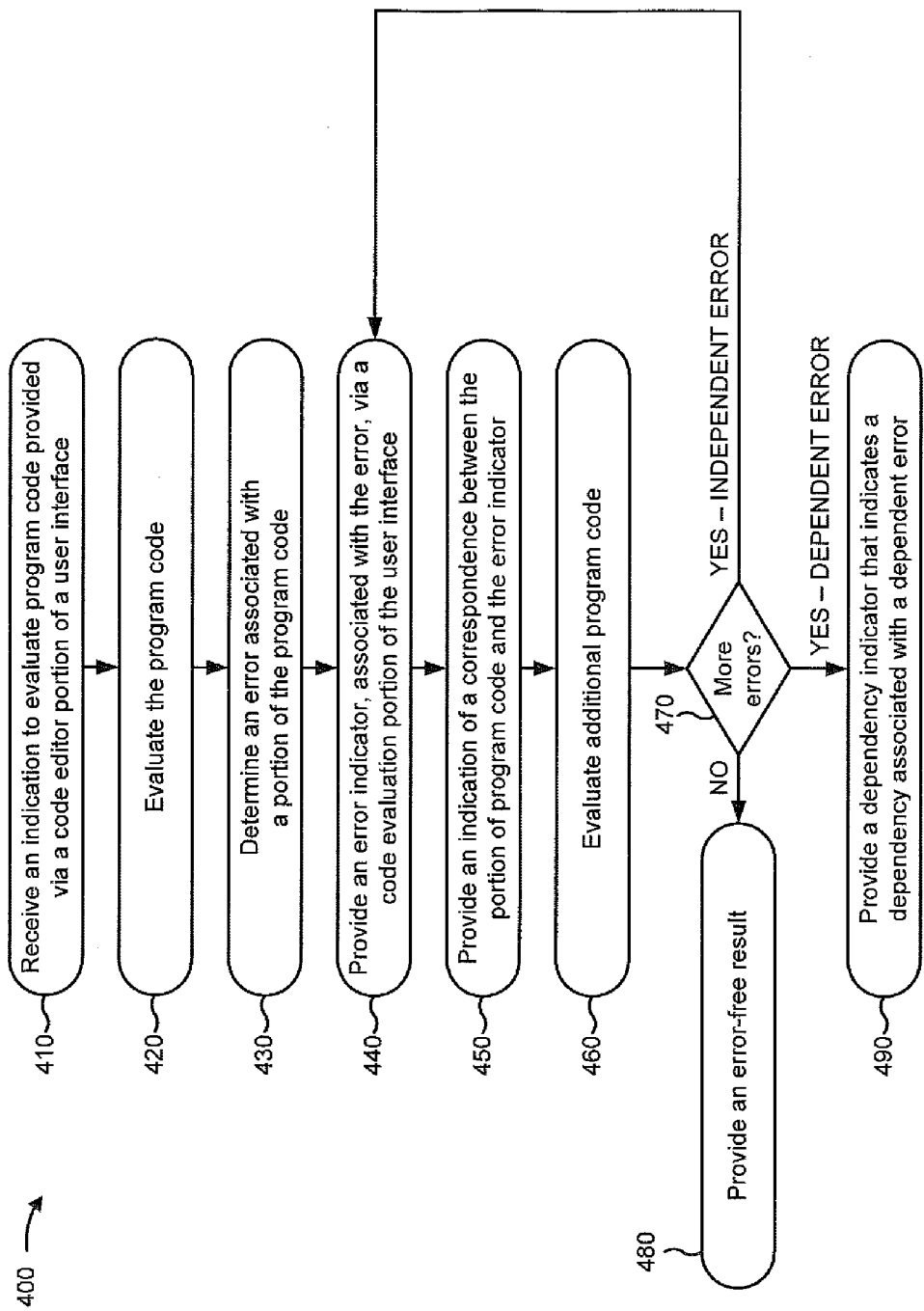

FIG. 5E

TECHNICAL COMPUTING ENVIRONMENT (TCE 220)

File | Edit | Tools | View | Evaluate | Debug

Code Editor Window

```
for i = 0 to 10
    k = 100 / i
end
```

Code Evaluation Window

```
k = 10 i = 0,  k = ERROR: Undefined value   ← 580
   i = 1,  k = 100
   i = 2,  k = 50
   i = 3,  k = 33.33
   i = 4,  k = 25
   i = 5,  k = 20
   i = 6,  k = 16.66
   i = 7,  k = 14.28
   i = 8,  k = 12.5
   i = 9,  k = 11.11
   i = 10, k = 10
```

575

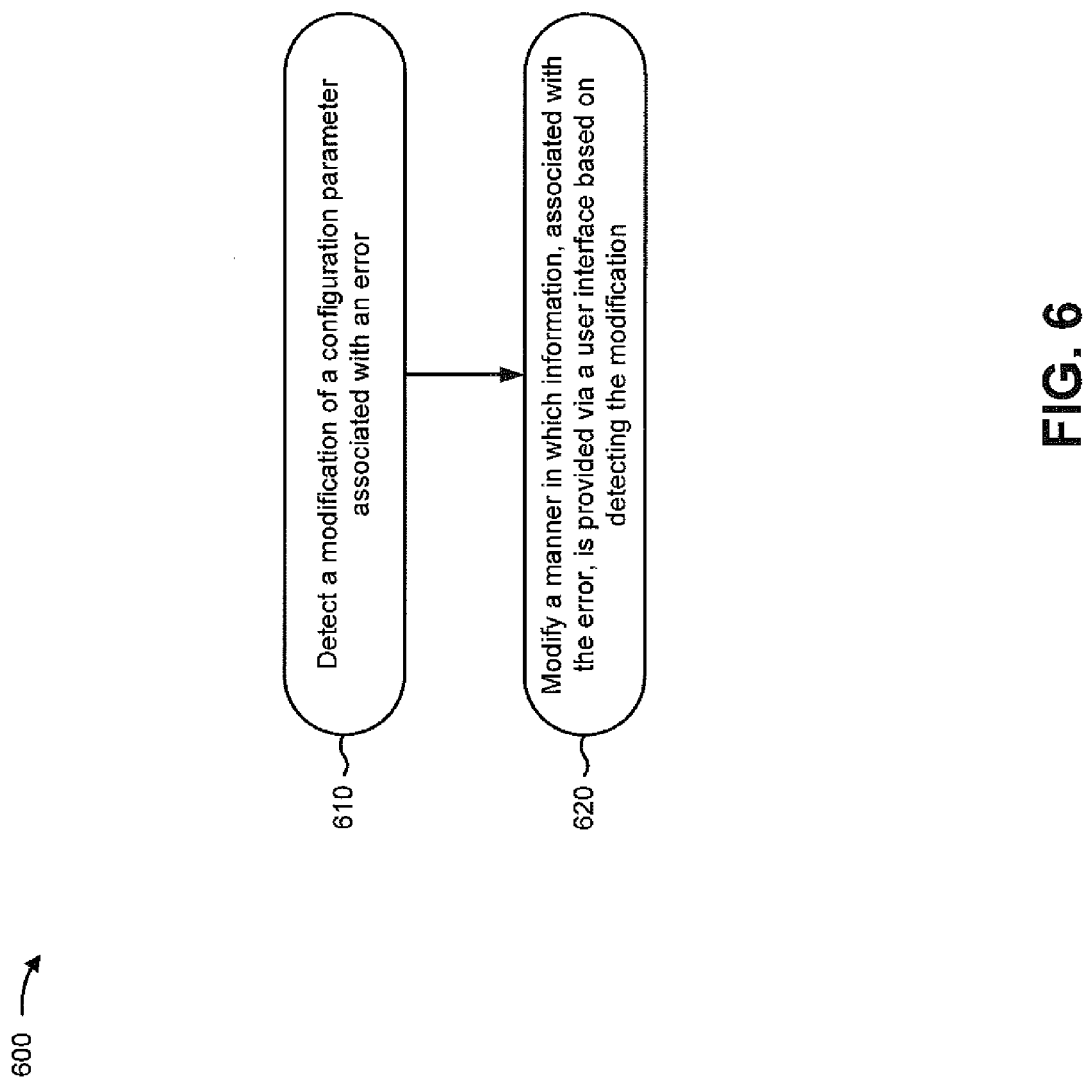

FIG. 7G

```
TECHNICAL COMPUTING ENVIRONMENT (TCE 220)
File   Edit   Tools   View   Evaluate   Debug Code Editor Window x = [1 2, 3 4, 5 6]

z = sqrt(a, b);   704 plot(x)

730
c = z + 1;

ploy(x)   712
```

Code Evaluation Window

Error in z = sqrt(a, b); Too many input arguments

Error in ploy(x): Undefined function ploy

PROGRAMMING ENVIRONMENT FOR EXECUTING PROGRAM CODE DESPITE ERRORS AND FOR PROVIDING ERROR INDICATORS

RELATED APPLICATION

This application is a continuation-in-part (CIP) of U.S. patent application Ser. No. 14/059,872, filed on Oct. 22, 2013, the content of which is incorporated by reference herein in its entirety.

BRIEF DESCRIPTION OF THE DRAWINGS

FIG. 4 is a flow chart of an example process for providing an indication of a correspondence between program code and an error associated with the program code;

FIGS. 5A-5E are diagrams of an example implementation relating to the example process shown in FIG. 4;

FIG. 6 is a flow chart of an example process for modifying a manner in which program code and/or an error is displayed based on a modification of a configuration parameter; and FIGS. 7A-7I are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A user of a computer programming environment may input program code that includes an error (e.g., that includes code that the programming environment is unable to evaluate, that evaluates to an incorrect value, etc.). The user may want to be notified of the error and to be notified of program code affected by the error. The user may also want other, error-free program code to execute despite the error. This would allow the user to easily debug program code that includes errors, while still running valid (e.g., error-free) portions of the program code unaffected by the error. Implementations described herein may assist a user (e.g., a computer programmer) in determining errors associated with program code while allowing error-free portions of program code to execute.

Figure 1:
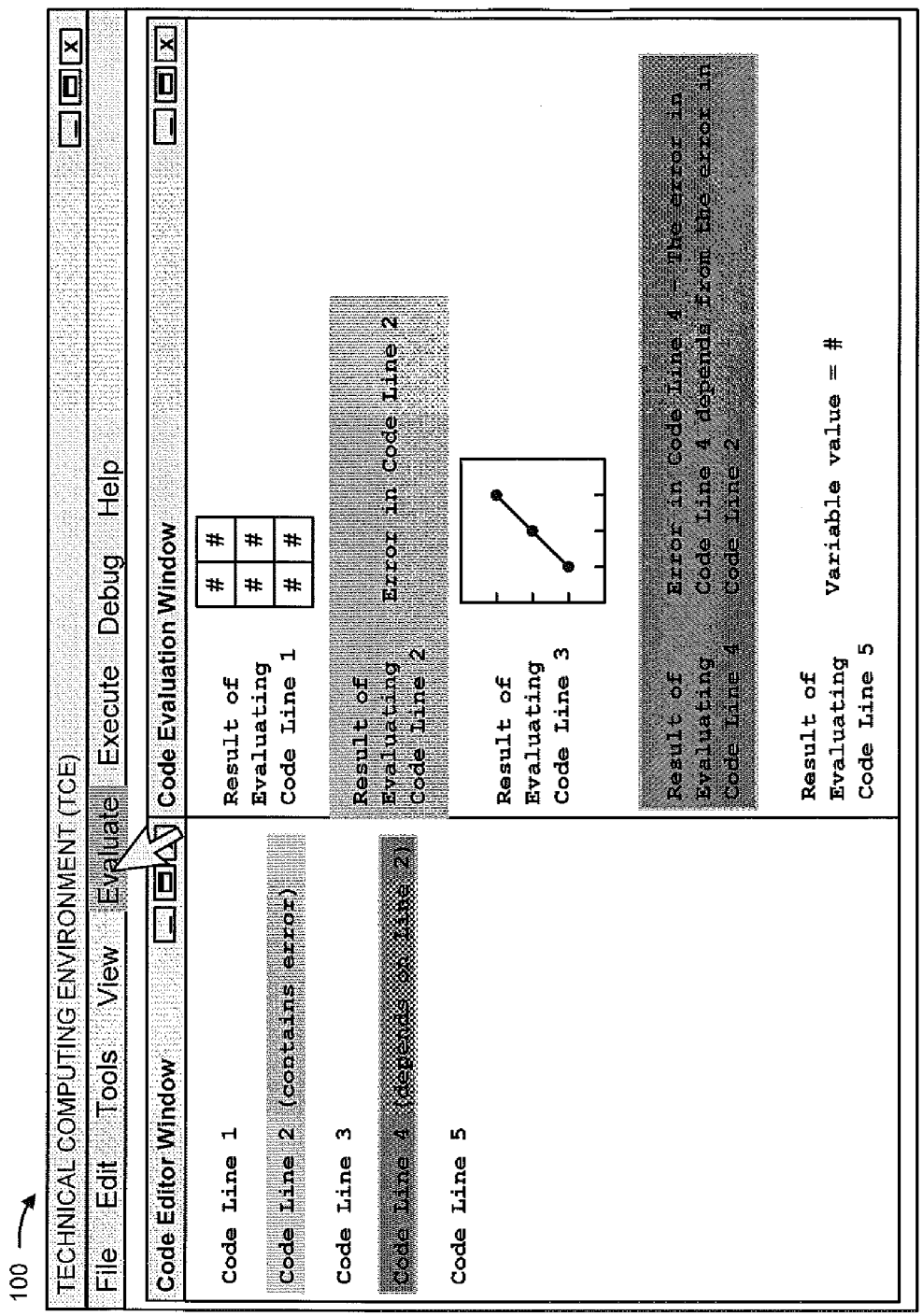
FIG. 1 is a diagram of an overview of an example implementation described herein.

FIG. 1 is a diagram of an overview of an example implementation 100 described herein. As shown in FIG. 1, a technical computing environment (TCE), such as a TCE running on a client device, may provide a code editor window that permits a user to input and/or view program code. The TCE may also provide a code evaluation window that provides a result of evaluating the program code and/or that provides an error associated with the program code. As shown, a user may interact with an input mechanism, such as an "Evaluate" button provided via the TCE. Based on the user interaction, the client device may evaluate the program code provided in the code editor window, and may display results of evaluating the program code, including errors associated with the program code, in the code evaluation window.

The TCE may provide multiple results associated with multiple portions (e.g., lines) of program code. A result may include a result of executing a portion of program code, and/or may include an error indicator that indicates an error associated with a portion of program code (e.g., based on a portion of program code failing to execute, executing incorrectly, etc.). For example, as shown in FIG. 1, the TCE may provide an indication of an error associated with the second line of program code (shown as "Code Line 2"). The TCE may also provide an indication of other lines of program code that depend from a code line with an error and/or that are affected by an error in another code line. For example, as shown in FIG. 1, the TCE may provide an indication that the fourth line of program code (shown as "Code Line 4") includes an error based on the fourth line of program code depending from the second line of program code (e.g., depending on the same variable, the same function, etc.).

The TCE may provide a correspondence indicator that indicates a correspondence between an error indicator, provided in the code evaluation window, and a portion of program code, provided in the code editor window, from which the error was generated. For example, as shown in FIG. 1, the TCE may highlight a particular line of code (e.g., Code Line 2), and may highlight an error that corresponds to the particular line of code. As further shown, the TCE may highlight a dependent line of code (e.g., Code Line 4, which depends from Code Line 2), and may highlight an error that corresponds to the dependent line of code. The TCE may also provide a dependency indicator that indicates a dependency relationship between erroneous lines of code and/or error indicators (e.g., "depends on Line 2"). The TCE may permit the user to input a variety of configuration parameters that control a manner in which an error, an error indicator, a correspondence indicator, and/or a dependency indicator is displayed, as described in more detail elsewhere herein. Furthermore, the TCE may execute error-free portions of code, as shown by the results, in the code evaluation window, that correspond to Code Lines 1, 3, and 5. In this way, a user may be able to easily spot errors associated with program code without halting execution of error-free portions of program code. Furthermore, the user may be able to correct errors and see a result of the correction in real-time to determine whether the program code is operating correctly.

Figure 2:
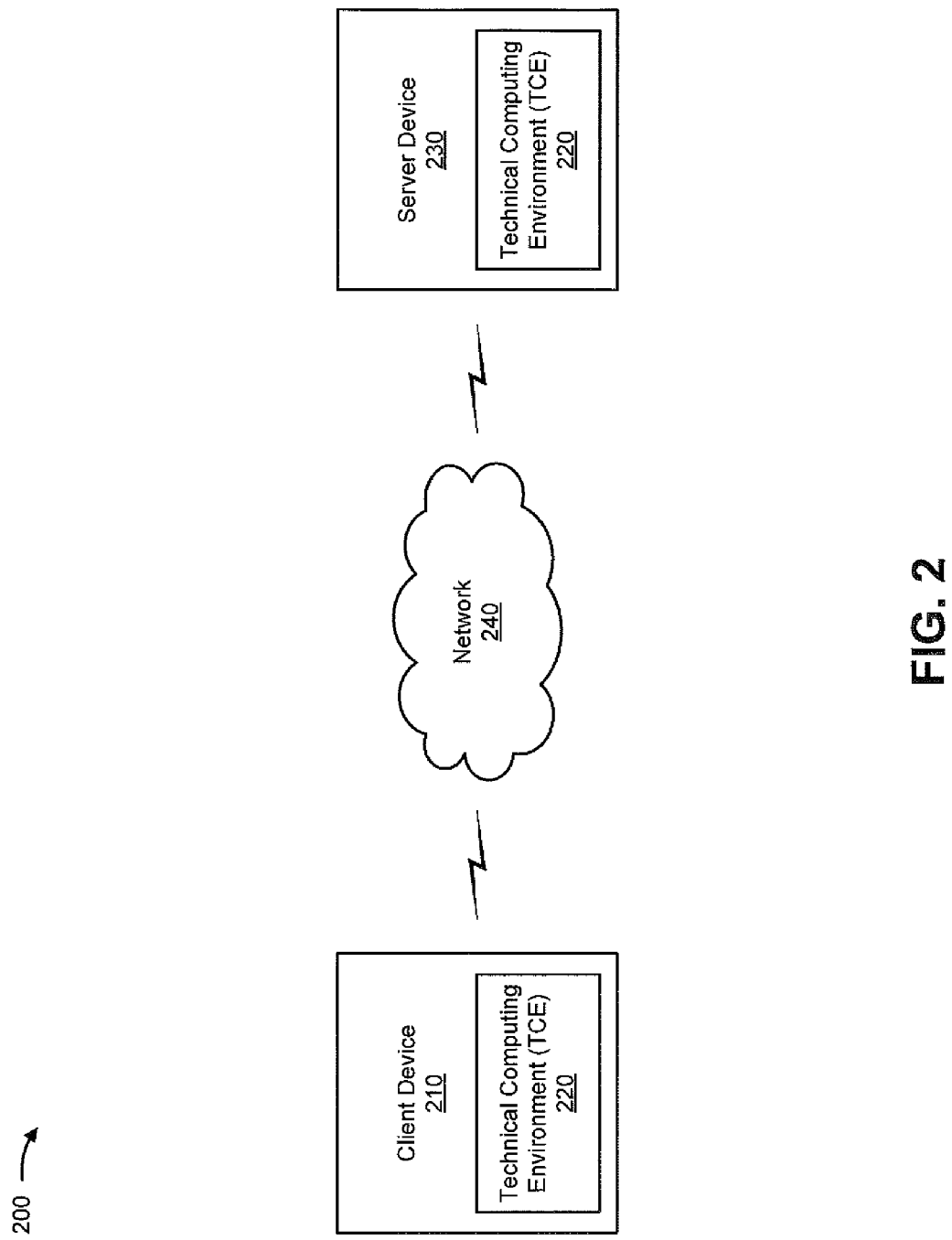
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code, an error associated with program code, etc.). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results (e.g., errors) corresponding to program code displayed in the code editor portion. TCE 220 may provide one or more error indicators that indicate an error generated based on a corresponding portion of program code (e.g., based on TCE 220 being unable to execute the portion of program code, based on an incorrect execution, etc.). TCE 220 may provide one or more correspondence indicators that indicate a correspondence between different portions of program code and respective results (e.g., errors) associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, a manner in which an error indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, or a similar device. In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 may interact with a scheduler (e.g., local to client device 210 or remote from client device 210) that schedules one or more portions of program code for execution by one or more remote processors. The remote processors may be included in one or more server devices 230. The scheduler may determine a quantity of processors to use to execute program code based on the complexity of the program code and/or a quantity of program code portions that are to be executed (e.g., a quantity of program code portions that a user identifies or selects for execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
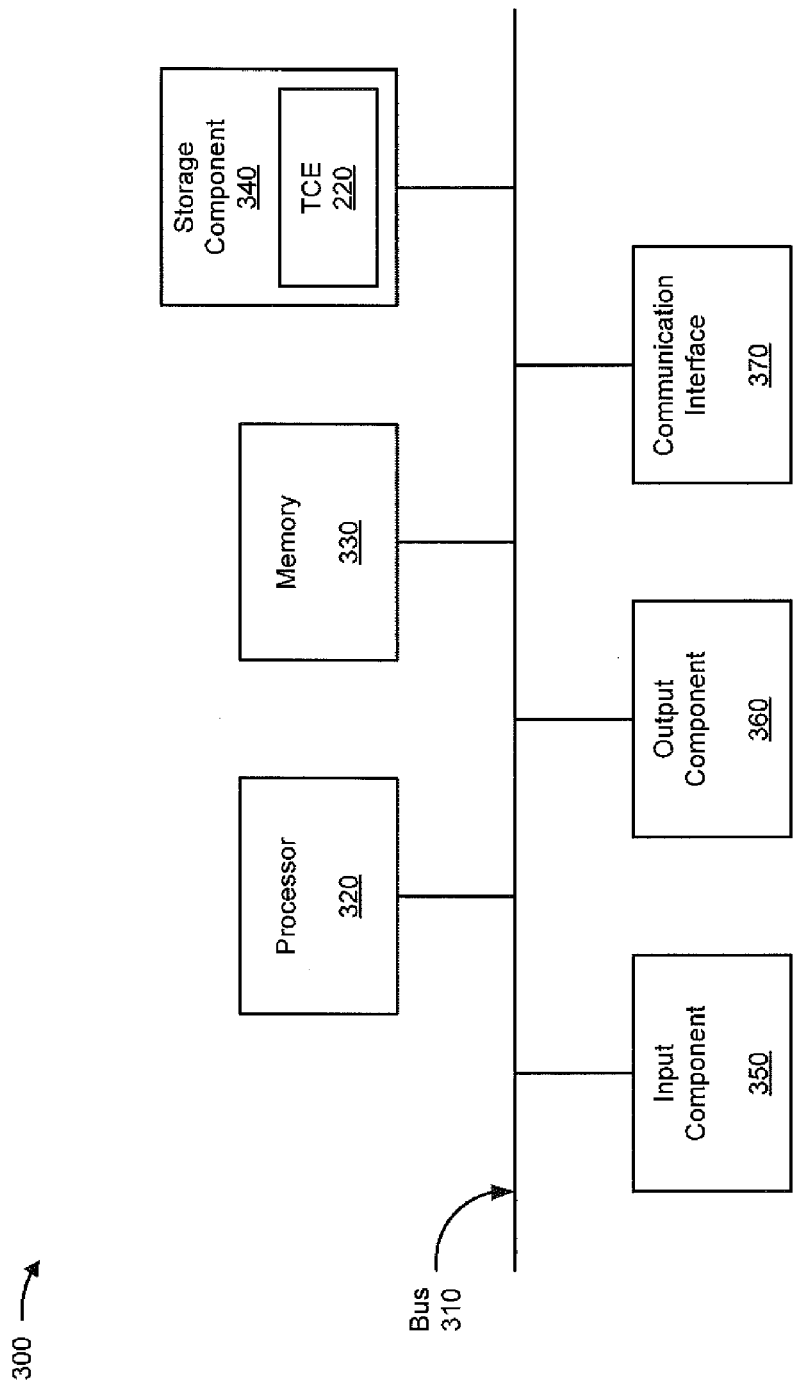
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for providing an indication of a correspondence between program code and an error associated with the program code. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving an indication to evaluate program code provided via a code editor portion of a user interface (block 410). For example, client device 210 may receive (e.g., based on user input) an indication to evaluate program code (e.g., an evaluation indicator) provided via a code editor window of a user interface (e.g., program code provided via TCE 220). Client device 210 may receive the evaluation indicator based on a user interaction with a user interface of TCE 220, in some implementations. For example, a user may interact with an input mechanism (e.g., a menu item, a button, a tool bar item, a gesture, an interaction with a touch screen, etc.) to provide the evaluation indicator to client device 210.

In some implementations, the evaluation indicator may include an indication to evaluate all of the program code provided via the code editor window. In some implementations, the evaluation indicator may include an indication to evaluate a portion of the program code provided via the code editor window (e.g., a portion of program code that includes errors). A portion of program code (sometimes referred to herein as a program code portion) may refer to a portion of a program, such as one or more lines of program code, a string of one or more characters of program code, a set of strings of program code, a block of program code, a function, a method, a script, an object, or the like.

In some implementations, a user may provide input identifying a portion of program code (e.g., by interacting with a portion of program code, by indicating one or more line numbers of code to be evaluated, by highlighting a portion of program code, etc.), and client device 210 may evaluate the identified portion of program code. For example, the user may select a portion of program code, may navigate away from a portion of program code (e.g., by pressing "Enter" on a keyboard to cause a line of program code to be left), may input a portion of program code, may input a syntactically correct portion of program code, or the like, to provide the evaluation indicator. Additionally, or alternatively, the evaluation indicator may be triggered based on a timer. For example, a user may input a portion of program code, and a particular amount of time may elapse that causes the evaluation indicator to be triggered.

Additionally, or alternatively, the evaluation indicator may identify an evaluation mode. The evaluation mode may include an execute mode for evaluating executable program code (e.g., program code without errors), a debug mode for evaluating the program code for errors, a help mode for evaluating the program code to provide help information associated with the program code, and/or another mode.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, VERILOG® code, JAVA® code, another type of hardware and/or software based code that may be compiled and/or synthesized, etc.), binary code that may be executed (e.g., executable files that may be directly executed by an operating system, bitstream files that may be used to configure an FPGA, JAVA® byte code, object files combined together with linker directives, source code, makefiles, etc.), text files that may be executed in conjunction with other executables (e.g., PYTHON® text files, OCTAVE® files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may correspond to a function, a script, an object, etc.

Client device 210 may provide, via TCE 220, a user interface that includes a code editor portion (e.g., a code editor window) for displaying program code, and that further includes a code evaluation portion (e.g., a code evaluation window) for displaying a result of evaluating the program code (e.g., error-free results, error indicators, etc.). In some implementations, client device 210 may provide multiple portions of program code via the code editor portion of the user interface, and may provide multiple corresponding results via the code evaluation portion of the user interface.

Client device 210 may concurrently provide both the code editor portion and the code evaluation portion via the user interface (e.g., both portions may be displayed on the user interface at the same time). In some implementations, client device 210 may provide the code editor portion and the code evaluation portion side-by-side, so as to convey a correspondence between a result, displayed in the code evaluation portion, and program code, displayed in the code editor portion, used to generate the result. Additionally, or alternatively, client device 210 may provide the code editor portion and the code evaluation portion in another manner (e.g., top to bottom).

In some implementations, client device 210 may receive input to toggle between displaying one or more results side-by-side (e.g., side-by-side with the program code, such as via a separate window) or in-line (e.g., in-line with program code, such as in the same window). As an example, a user may identify one or more results to be provided in-line with program code, and client device 210 may provide the results in-line with corresponding program code (e.g., in the code editor window), where a result is provided immediately after program code used to generate the result. As another example, the user may identify one or more results to be provided side-by-side with program code (e.g., in the code evaluation window), and client device 210 may provide the results side-by-side with corresponding program code (e.g., as described elsewhere herein). In some implementations, client device 210 may differentiate program code from results provided in-line, such as by marking the program code and/or results in a different manner (e.g., highlighting the results, highlighting the code, etc.).

As further shown in FIG. 4, process 400 may include evaluating the program code (block 420). For example, client device 210 may evaluate the program code based on receiving the indication to evaluate the program code.

Client device 210 may evaluate the program code based on one or more selected evaluation modes. In some implementations (e.g., when the execute mode is specified), client device 210 may evaluate the program code by executing the program code. Additionally, or alternatively (e.g., when the debug mode is specified), client device 210 may evaluate the program code by determining one or more errors associated with the program code (e.g., by determining one or more portions of program code that fail to execute). Additionally, or alternatively (e.g., when the help mode is specified), client device 210 may evaluate the program code by determining to provide help information associated with the program code.

In some implementations, client device 210 may provide information identifying one or more portions of program code to one or more server devices 230 for evaluation (e.g., serially or in parallel). For example, client device 210 may run a browser for receiving input to be provided to server device(s) 230 and/or for displaying information received from server device(s) 230. Server device(s) 230 may evaluate the portion(s) of program code, and may provide one or more respective results of evaluating the portion(s) of program code to client device 210. Similarly, client device 210 and/or server device 230 may analyze program code to determine dependencies. Client device 210 and/or server device 230 may break the code into portions (e.g., based on the dependencies), and may evaluate different portions of the code serially and/or in parallel.

As further shown in FIG. 4, process 400 may include determining an error associated with a portion of the program code (block 430). For example, client device 210 may determine an error associated with a portion of the program code. In some implementations, client device 210 may determine the error by attempting to execute the program code portion and determining that the program code portion cannot be executed. Additionally, or alternatively, client device 210 may determine the error by executing the program code and determining that the program code produced an incorrect result. An error may include one or more error types, such as a compilation error (e.g., an error that prevents the program code from running), a run-time error (e.g., an error that occurs when the program code runs), a logic error (e.g., an error that prevents program code from operating as intended), a syntax error (e.g., an error due to a violation of a rule of a program code language), a latent error (e.g., an error that is only an error under particular conditions), a corresponding error (e.g., an error that corresponds to a selected portion of program code), an independent error (e.g., an error that does not depend from another error in another portion of program code other than the portion to which the independent error corresponds), a dependent error (e.g., an error that depends from another portion of program code other than the portion to which the dependent error corresponds), or the like.

As further shown in FIG. 4, process 400 may include providing an error indicator, associated with the error, via a code evaluation portion of the user interface (block 440). For example, client device 210 may provide the error indicator via a code evaluation window of a user interface provided via TCE 220. An error indicator may provide a notification of an error associated with program code. For example, an error indicator may include a message (e.g., an error message), a character, an image, an icon, etc. In some implementations, the error indicator may indicate an error type, such as a compilation error, a run-time error, a logic error, etc. Additionally, or alternatively, the error indicator may indicate a cause of the error and/or may provide information associated with fixing the error.

The error indicator may provide suggested program code for fixing the error, in some implementations. Client device 210 may determine suggested program code that is similar to erroneous program code (e.g., provided in the code editor window), but that is valid (e.g., error-free). For example, client device 210 may suggest a different function that is valid for particular input arguments (e.g., input arguments included in erroneous code), may suggest different input arguments and/or a different quantity of input arguments that are valid for a particular function (e.g., a function included in the erroneous code), may suggested a correct spelling (e.g., of a function, a variable used elsewhere in the code, etc.), may suggest syntax characters that correct an error (e.g., a parenthesis, an END statement, etc.), or the like. In some implementations, client device 210 may provide multiple suggested code portions.

In some implementations, client device 210 may evaluate each suggested code portion, and may provide a corresponding result of evaluating each suggested code portion. Additionally, or alternatively, client device 210 may provide an indication of results associated with a dependent code portion (e.g., that depends from an erroneous code portion) for each suggested code portion. Client device 210 may receive user input selecting a suggested code portion, a corresponding result of evaluating a suggested code portion, and/or a corresponding result of evaluating a dependent code portion based on the suggested code portion. Client device 210 may replace erroneous program code with a suggested code portion based on the user selection.

Client device 210 may evaluate multiple portions of program code in series or in parallel, and may provide one or more respective results, such as one or more respective error indicators, corresponding to the multiple portions of evaluated program code, in some implementations. For example, client device 210 may evaluate a first portion of program code (e.g., provided via the code editor window), may provide a first result corresponding to the first portion of program code (e.g., via the code evaluation window), may evaluate a second portion of program code (e.g., provided via the code editor window), may provide a second result corresponding to the second portion of program code (e.g., via the code evaluation window), etc.

Client device 210 may provide one or more results based on one or more configuration parameters, in some implementations. For example, client device 210 may receive information identifying a configuration parameter that controls a manner in which results are provided and/or displayed. Client device 210 may provide and/or display the results based on the identified configuration parameter. Configuration parameters are described in more detail elsewhere herein.

In some implementations, client device 210 may provide the program code and the program code evaluation results in separate windows and/or separate portions of the user interface. For example, client device 210 may not provide the results in-line with the code. Client device 210 may not provide the results in between portions (e.g., lines) of program code, so that consecutive (e.g., adjacent) portions of program code are not interrupted by providing results in between the consecutive portions. For example, a group of program code portions may be provided together, and a group of results may be provided together, but the two groups may be provided separately, such that the program code portions and the results are not interlaced in the user interface (e.g., in the code editor window).

As further shown in FIG. 4, process 400 may include providing an indication of a correspondence between the portion of program code and the error indicator (block 450). For example, client device 210 may provide, via a user interface of TCE 220, an indication of a correspondence (e.g., a correspondence indicator) between the program code and the error associated with the program code (e.g., an error identified by an error indicator). In some implementations, client device 210 may provide the correspondence indicator for a particular program code portion and a corresponding error indicator based on user input that identifies the particular program code portion and/or the corresponding error indicator (e.g., user selection of the particular program code portion and/or the corresponding error indicator via clicking, gesturing, touching, navigating to a line, etc.).

Client device 210 may provide the correspondence indicator via the code editor window and/or the code evaluation window, in some implementations. For example, client device 210 may provide a first correspondence indicator related to a particular portion of code, and/or may provide a second correspondence indicator related to a particular result generated by evaluating the particular portion of code. A correspondence indicator may include, for example, highlighting the particular portion of code and the corresponding result (e.g., using a same color), outlining the particular portion of code and the corresponding result (e.g., using a same color, line weight, line style, etc.), marking the particular portion of code and the corresponding result (e.g., using a same number, letter, character, symbol, etc.), or the like.

Additionally, or alternatively, client device 210 may provide the correspondence indicator by aligning the particular portion of code and the corresponding result (e.g., aligning a top boundary of the portion of code with a top boundary of the result, aligning a bottom boundary of the portion of code with a bottom boundary of the result, aligning a center, such as a vertical or horizontal center, of the portion of code with a center of the result, aligning a top boundary with a vertical center, aligning a bottom boundary with a vertical center, etc.). Additionally, or alternatively, client device 210 may provide multiple results, in the code evaluation window, in the same order that respective multiple portions of program code, used to generate the multiple results, are provided in the code editor window.

Client device 210 may provide the correspondence indicator based on one or more configuration parameters, in some implementations. For example, client device 210 may receive information identifying a configuration parameter. Client device 210 may provide the correspondence indicator based on the identified configuration parameter. Configuration parameters are described in more detail elsewhere herein.

As further shown in FIG. 4, process 400 may include evaluating additional program code (block 460), and determining whether the additional program code includes an error (block 470). For example, client device 210 may determine whether a program includes additional program code (e.g., after determining an error associated with a portion of program code included in the program), and may evaluate the additional program code for errors. The additional program code may include error-free program code, program code with a dependent error (e.g., an error that depends on a previously-determined error), program code with an independent error (e.g., an error that does not depend on a previously-determined error), or the like.

In some implementations, client device 210 may partition a program (e.g., that includes multiple portions of program code) into multiple portions of program code. For example, client device 210 may partition the program into blocks of program code, such as by partitioning functions, methods, classes, loops, conditional statements, independent portions of program code, separate lines of program code, or a combination of these or other partitions. Client device 210 may evaluate the partitioned portions sequentially and/or may schedule the partitioned portions of code for sequential evaluation, and may determine a result of each evaluation. If a partitioned portion of program code includes an error, client device 210 may provide an error indicator, and may move to a next partition for evaluation.

If the additional program code does not include an error (block 470—NO), then process 400 may include providing an error-free result (block 480). For example, client device 210 may evaluate (e.g., execute) the additional program code, may provide a result (e.g., an error-free result) of evaluating the additional program code, and may provide an indication of a correspondence between the additional program code and the result. In some implementations, client device 210 may provide the error-free result via the code evaluation portion of the user interface. In this way, client device 210 may continue to execute a program even when a portion of program code, included in the program, includes an error. For example, when client device 210 encounters an error, client device 210 may evaluate a next portion of program code.

In some implementations, client device 210 may execute a test suite (e.g., a debugger) as the program code is executed. The test suite may determine a first result (e.g., a test result) based on testing a portion of program code, and client device 210 may determine a second result (e.g., an evaluation result) of evaluating the same portion of program code. The first result and the second result may be different, in some implementations. For example, the first result may include a test result that indicates whether the portion of program code passed one or more tests included in the test suite, and the second result may include an evaluation result generated based on executing the portion of program code. The test suite may perform tasks such as, but not limited to, code coverage, code validation, and code verification. Client device 210 may provide the first result and the second result via the user interface in a same section (e.g., in the code evaluation window) or different sections (e.g., may provide the first result in the code editor window and may provide the second result in the code evaluation window, or vice versa).

If the additional program code includes an independent error (block 470—YES—INDEPENDENT ERROR), then process 400 may include providing an error indicator, associated with the independent error, via a code evaluation portion of the user interface (block 440), and providing an indication of a correspondence between the additional program code and the error indicator (block 450). For example, client device 210 may determine that the error, associated with the additional program code, is an independent error (e.g., does not depend from a previously-determined error). Based on the determination, client device 210 may provide an error indicator that identifies the independent error, and may provide a correspondence indicator that indicates a correspondence between the additional program code (e.g., an additional program code portion) and the independent error.

If the additional program code includes a dependent error (block 470—YES—DEPENDENT ERROR), then process 400 may include providing a dependency indicator that indicates a dependency associated with a dependent error (block 490). For example, client device 210 may determine that the error, associated with the additional program code, is a dependent error. A dependent error may include an error that depends from another error, an error that corresponds to a program code portion that depends from another program code portion that includes an error, or the like.

For example, a dependent line of code may share a same variable as a preceding line of code, may share a same function as a dependent line of code, may depend on an output from a preceding line of code (e.g., an output from a preceding line of code that is provided as an input to the dependent line of code), may generate a result that is changed based on changing the preceding line of program code, or the like. Client device 210 may provide an error indicator for the dependent error, and may provide a correspondence indicator between the error indicator and a corresponding portion of program code. Additionally, or alternatively, client device 210 may provide a dependency indicator by providing a correspondence indicator between the error indicator, for the dependent error, and a portion of program code (e.g., a preceding portion of program code) from which the dependent error depends.

Client device 210 may provide a dependency indicator that indicates a dependency between a dependent error and another error (e.g., another independent or dependent error). A dependency indicator may include, for example, highlighting the dependent error and the other error (e.g., using a same color), outlining the dependent error and the other error (e.g., using a same color, line weight, line style, etc.), marking the dependent error and the other error (e.g., using a same number, letter, character, symbol, etc.), or the like. In some implementations, a dependency indicator may identify related errors, related error indicators, and/or related lines of program code.

Client device 210 may continue to operate in this manner (e.g., by iteratively performing process 400), evaluating program code and providing results and/or error indicators associated with the evaluation, until all or a selected portion of program code has been evaluated. In this way, client device 210 may allow a user to easily identify errors, including independent and dependent errors. Furthermore, client device 210 may permit a program to execute even when a portion of the program includes an error. Additionally, client device 210 may permit a user to debug program code in real-time by correcting program code (e.g., to remove errors) and providing a result associated with the corrected program code.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of partitioning and evaluating program code that includes errors, providing a correspondence indicator between a portion of program code and a corresponding error, providing a dependency indicator between a dependent error and another error, and providing suggested program code to replace errors.

Figure 5A:
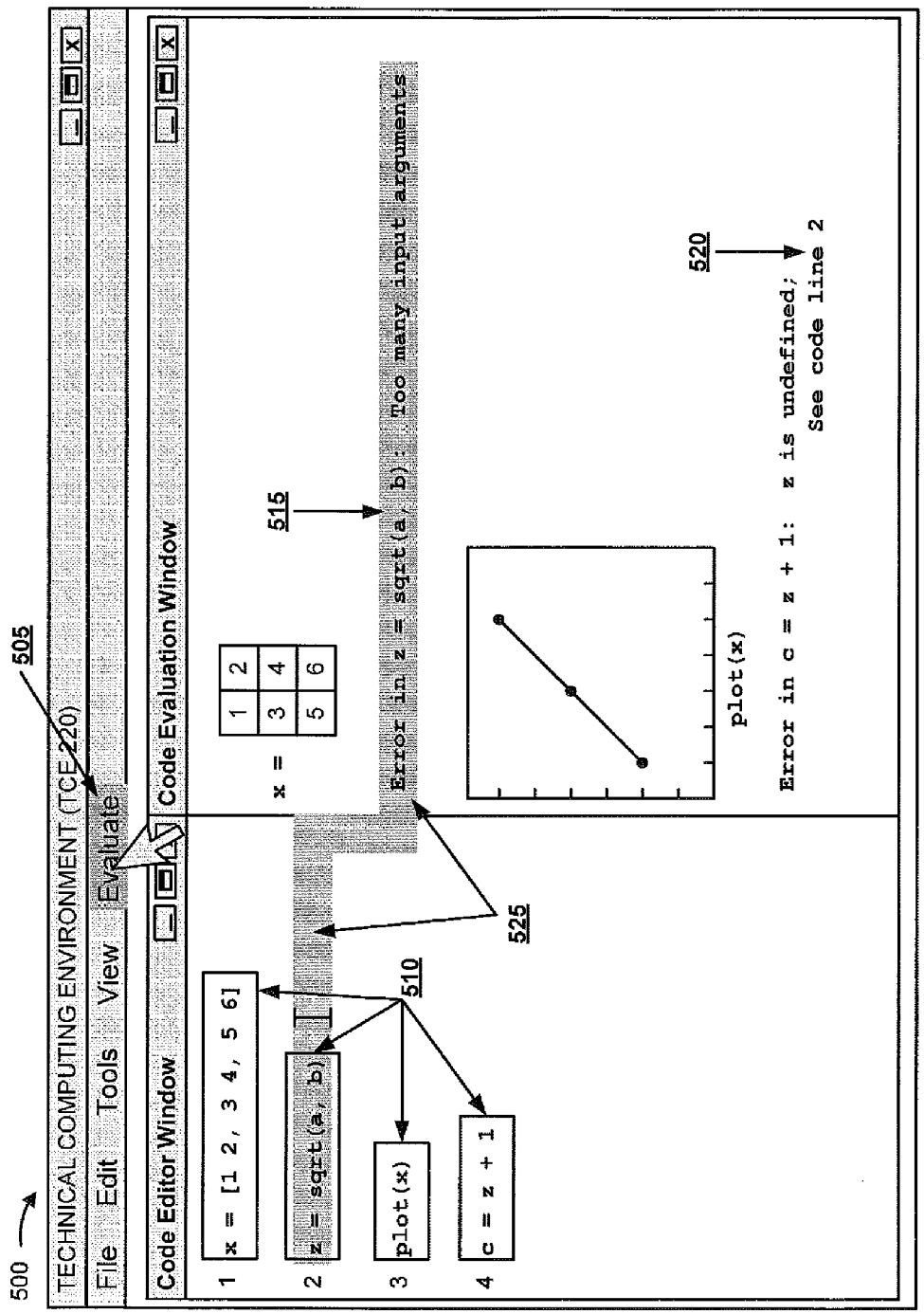

As shown in FIG. 5A, a user may interact with TCE 220 to provide an indication, to client device 210, to evaluate program code in a code editor window of a user interface associated with TCE 220. For example, as shown by reference number 505, the user may interact with an "Evaluate" button and/or another input mechanism.

Assume that user interaction with the "Evaluate" button causes client device 210 to partition the program code in the code editor window. For example, assume that client device 210 partitions the four lines of program code shown in FIG. 5A into four partitions, as shown by reference number 510. Further assume that user interaction with the "Evaluate" button causes client device 210 to evaluate the partitioned program code, and to provide corresponding program code evaluation results (e.g., error-free results, error indicators, etc.) in the code evaluation window. For example, assume that client device 210 evaluates the first partitioned line of program code, x=[1 2, 3 4, 5 6], to generate a three by two array stored using the variable x, and provides a representation of the three by two array stored in x, as shown. After evaluating the first line of program code, client device 210 moves to the next partition and evaluates the second partitioned line of program code, z=sqrt(a, b), and determines that the second line of program code cannot be executed. As shown by reference number 515, assume that client device 210 provides an error message indicating that the second line of program code cannot be executed (e.g., "Error in z=sqrt(a, b)"), and provides an explanation indicating a reason that the second line of code cannot be executed (e.g., "Too many input arguments").

After determining that the second line of program code includes an error, client device 210 moves to the next partition and evaluates the third partitioned line of program code, plot(x), to generate a plot based on the three by two array stored in x, and provides a representation of the plot, as shown. After evaluating the third line of program code, client device 210 moves to the next partition and evaluates the fourth partitioned line of program code, c=z+1, to calculate a value of z+1 and store the calculated value in the variable c. However, client device 210 may determine that the fourth line of program code includes an error associated with the value of z (and therefore the value of c) because the second line of code, used to determine the value of z, is associated with an error. As shown, assume that client device 210 provides an error message indicating that the fourth line of program code is associated with an error (e.g., "Error in c=z+1"), and provides an explanation indicating a reason that the error message was generated (e.g., "z is undefined"). Further, assume that client device 210 provides a dependency indicator indicating that the error in the fourth line of code depends from the second line of code (e.g., "See code line 2"), as shown by reference number 520. Client device 210 determines that there are no remaining partitions, and stops evaluating program code.

Assume that the user interacts with the second line of program code (e.g., by placing a cursor on the second line of code, by hovering the cursor over the second line of code, by clicking on the second line of code, etc.). Based on the user interaction, assume that client device 210 highlights the second line of program code, and also highlights an error indicator that corresponds to the second line of program code (e.g., "Error in z=sqrt(a, b)"), as shown by reference number 525. As shown, assume that client device 210 highlights the second line of program code and the error indicator using the same color. In some implementations, client device 210 may align the second line of program code (e.g., an erroneous line of code) and the corresponding error indicator. Additionally, or alternatively, client device 210 may provide the correspondence indicator without detecting a user interaction with the second line of code.

Figure 5B:
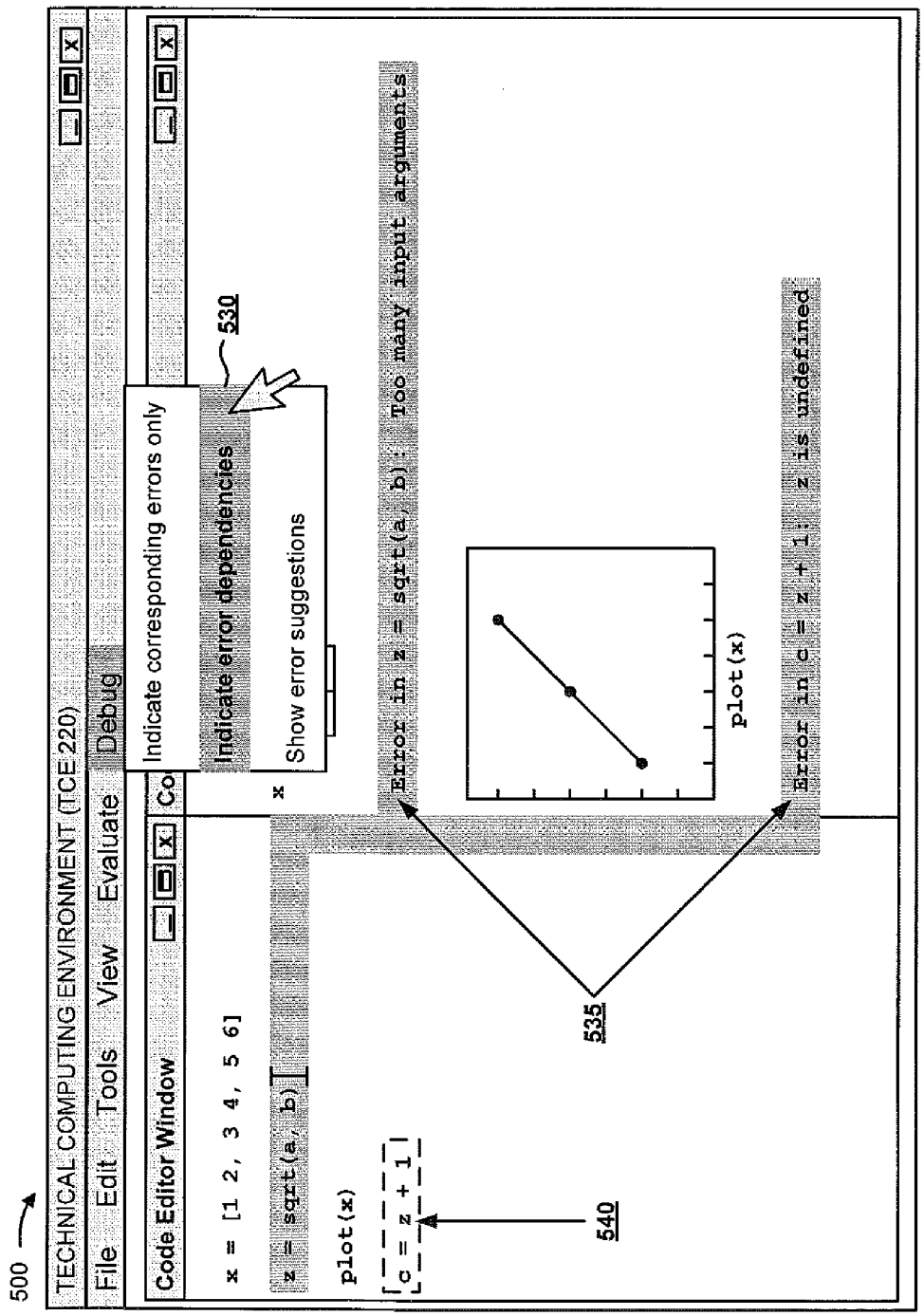

As shown in FIG. 5B, and by reference number 530, assume that the user interacts with an input mechanism (e.g., a menu item) to provide an indication that client device 210 is to provide dependency indicators. Based on the user interaction, assume that client device 210 highlights all errors that depend from the selected line of program code (e.g., the second line of program code). As shown by reference number 535, client device 210 highlights both the error indicator corresponding to the second line of program code (e.g., "Error in z=sqrt(a, b)") and the error indicator that corresponds to the fourth line of program code (e.g., "Error in c=z+1") since the fourth line of program code depends from the second line of program code (e.g., both lines of program code share the variable z). As shown, client device 210 highlights both error indicators using the same color. In some implementations, client device 210 may highlight a corresponding error (e.g., an error that directly corresponds to the selected line of program code) using a first color, and may highlight a dependent error using a second color. As shown by reference number 540, client device 210 may provide an indication of a line of program code that depends from the selected line of program code.

Figure 5C:
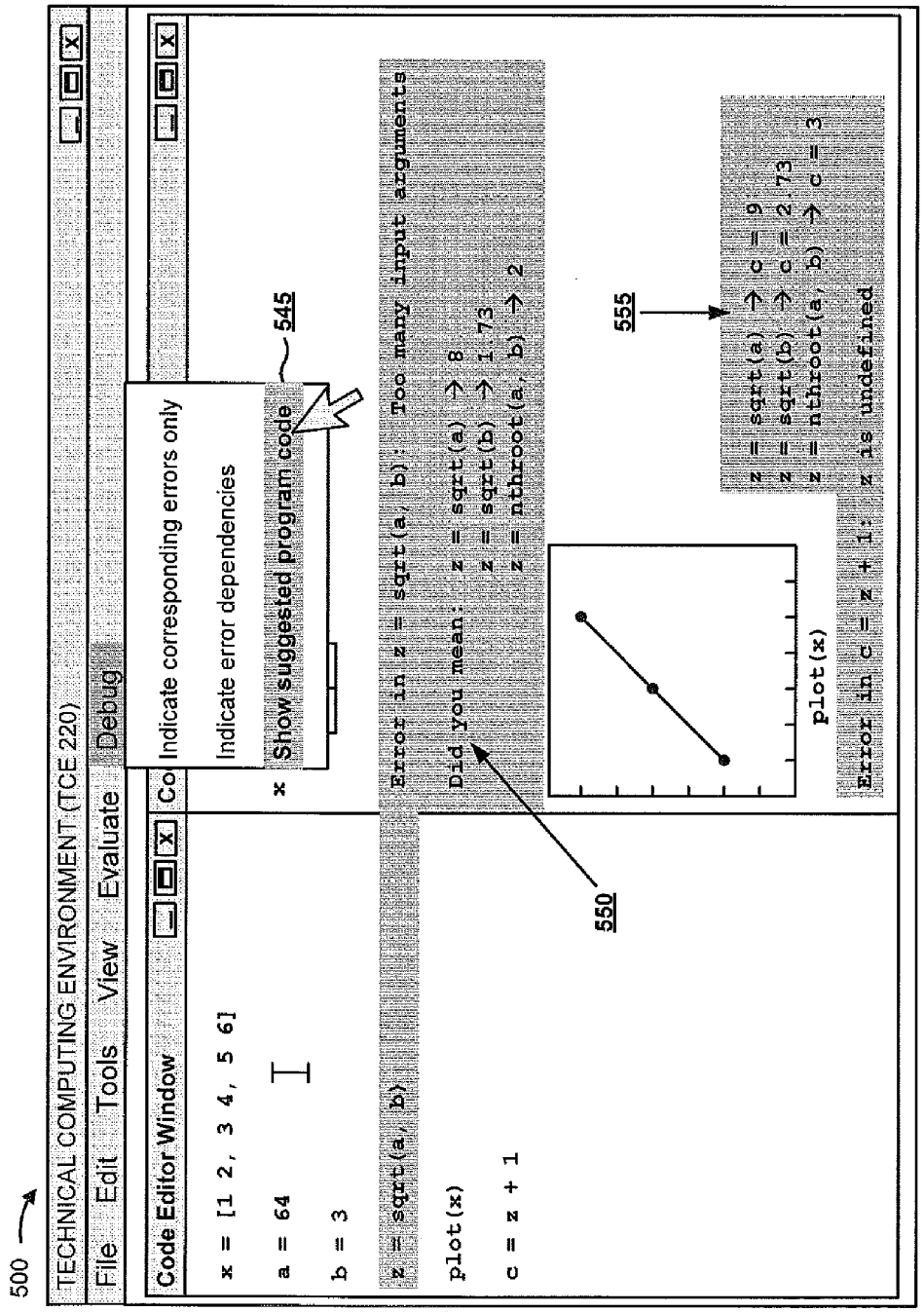

As shown in FIG. 5C, and by reference number 545, assume that the user interacts with an input mechanism (e.g., a menu item) to provide an indication that client device 210 is to show suggested program code for portions of program code that contain errors. Based on the user interaction, assume that client device 210 determines valid (e.g., error-free) program code statements that are similar to the program code shown as z=sqrt(a, b). For example, assume that client device 210 determines three suggested program code portions for correcting the error in z=sqrt(a, b), and determines three respective results of evaluating the three suggested program code portions. As shown by reference number 550, client device 210 provides first suggested code, shown as z=sqrt(a), and a result of evaluating the first suggested code (e.g., 8), provides second suggested code, shown as z=sqrt(b), and a result of evaluating the second suggested code (e.g., 1.73), and provides third suggested code, shown as z=nthroot(a, b), and a result of evaluating the third suggested code (e.g., 2). In some implementations, a user may select a suggested code portion, and client device 210 may replace the erroneous code (e.g., z=sqrt(a, b)) with the selected suggested code portion.

As shown by reference number 555, client device 210 may also provide an indication of how a suggested portion of code impacts a result that corresponds to a dependent portion of code. For example, for the line of code shown as c=z+1, client device 210 provides the first suggested code, shown as z=sqrt(a), and a corresponding value of c (e.g., 9), provides the second suggested code, shown as z=sqrt(b), and a corresponding value of c (e.g., 2.73), and provides third suggested code, shown as z=nthroot(a, b), and a corresponding value of c (e.g., 3). In some implementations, a user may select a suggested code portion and/or a value of c, and client device 210 may replace the erroneous code (e.g., z=sqrt(a, b)) with the selected suggested code portion or the suggested code portion that corresponds to the selected value of c. Suggested code may be based, in whole or in part, on tasks performed by a test suite. For example, the test suite may determine that complete code coverage is obtained if an input received from the user is modified. In some implementations, client device 210 may substitute the modified input produced by the test suite for the input received from the user. Additionally, or alternatively, client device 210 may allow the user to accept or reject the modified input.

Figure 5D:
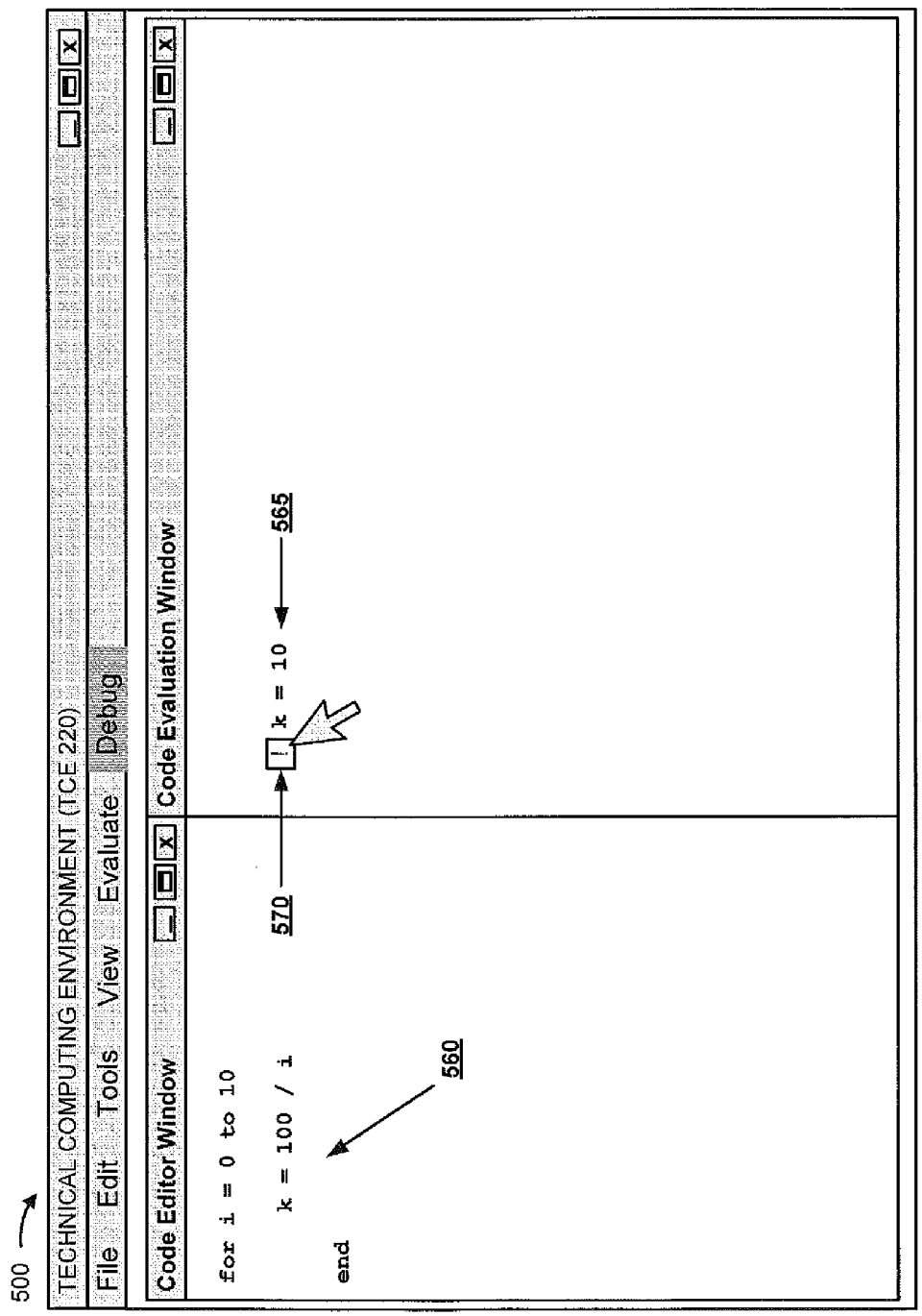

As shown in FIG. 5D, and be reference number 560, assume that the user inputs the following block of program code (e.g., a FOR loop) into the code editor window:

for i=0 to 10
  k=100/i
end.

Assume that client device 210 executes the above program code, generates a final result of k=10, and provides this final result via the code evaluation window, as shown by reference number 565. However, one of the values of k generated during execution of the FOR loop generated an error. When i=0, the value of k=100/i is undefined. Based on this error, client device 210 provides an input mechanism the enables a user to expand the result to view the error, as shown by reference number 570. Assume that the user interacts with the input mechanism.

As shown in FIG. 5E, user interaction with the input mechanism causes client device 210 to display expanded result for each iteration of the FOR loop, as shown by reference number 575. Furthermore, client device 210 provides an error indicator associated with the iteration where i=0 (e.g., k=ERROR: Undefined value), as shown by reference number 580. Some implementations may use similar techniques to allow the user to perform expansion operations in the code editor window to view details regarding underlying lines of code (e.g., making up a function). Expanding code blocks in the code editor window may allow a user to accurately associate an executed line of code with a result in the evaluation window.

As indicated above, FIGS. 5A-5E are provided merely as an example. Other examples are possible and may differ from what was described with regard to FIGS. 5A-5E.

FIG. 6 is a flow chart of an example process 600 for modifying a manner in which program code and/or an error is displayed based on a modification of a configuration parameter. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include detecting a modification of a configuration parameter associated with an error (block 610), and modifying a manner in which information, associated with the error, is provided via a user interface based on detecting the modification (block 620). For example, client device 210 may detect a modification of a configuration parameter (e.g., based on user input identifying information associated with the configuration parameter). The configuration parameter may control a manner in which one or more error indicators, correspondence indicators, dependency indicators, results, and/or portions of program code are provided or displayed (e.g., in the code evaluation window and/or the code editor window).

The configuration parameter may control whether information is shown (e.g., provided) or hidden (e.g., not provided) on the user interface, in some implementations. For example, client device 210 may show or hide one or more error indicators (e.g., a selected error indicator, all error indicators, etc.), may show or hide one or more correspondence indicators (e.g., a selected correspondence indicator, all correspondence indicators, etc.), one or more dependency indicators (e.g., a selected dependency indicator, all dependency indicators, etc.), one or more portions of program code (e.g., a selected portion of program code, program code that includes an error, program code that includes a dependent error, program code that includes an independent error, error-free program code, etc.), or the like, based on the configuration parameter. Additionally, or alternatively, client device 210 may delete information (e.g., an error indicator, erroneous code, etc.) based on the configuration parameter.

For example, a user may modify a configuration parameter so that only erroneous code is provided in the code editor window, so that only program code corresponding to an independent error is provided in the code editor window, so that only program code corresponding to a dependent error is provided in the code editor window, so that program code associated with one or more error types is provided in the code editor window, so that only error-free program code is provided in the code editor window, or the like. Similarly, the user may modify a configuration parameter so that only error indicators are provided in the code evaluation window, so that only error indicators associated with independent errors are provided in the code evaluation window, so that only error indicators associated with dependent errors are provided in the code evaluation window, so that error indicators that indicate one or more error types are provided in the code evaluation window, so that only non-error results are provided in the code evaluation window, or the like.

In some implementations, when a particular error indicator is hidden (e.g., not displayed), client device 210 may modify the corresponding code portion to indicate that the error indicator corresponding to the code portion has been hidden. For example, client device 210 may insert a semicolon (;) at the end of a line of code when an error indicator corresponding to that line of code is hidden.

In some implementations, a configuration parameter may control a manner in which a correspondence indicator is displayed. The configuration parameter may control a style of the correspondence indicator. For example, a user may provide input specifying whether the correspondence indicator is to highlight a code portion and a corresponding error indicator, outline the code portion and the corresponding error indicator, mark the code portion and the corresponding error indicator (e.g., using a character, a number, a letter, a symbol, etc.), or the like. Additionally, or alternatively, the user may provide input identifying a color for the highlighting, a line style for the outlining, a marking indicator for the marking (e.g., using numbers, letters, etc.), or the like. Client device 210 may display the correspondence indicator based on the configuration parameter.

Additionally, or alternatively, a configuration parameter may control a manner in which one or more correspondence indicators are applied to different types of errors and/or corresponding code portions. For example, a first correspondence indicator may be applied to a first error (e.g., of a first error type), and a second correspondence indicator may be applied to a second error (e.g., of a second error type). An error type may include, for example, a corresponding error (e.g., an error corresponding to a selected program code portion), an independent error, or a dependent error. Additionally, or alternatively, an error type may include, for example, a compilation error, a run-time error, a logic error, a syntax error, a latent error, or the like.

As an example, a first correspondence indicator may be applied to a corresponding error (e.g., associated with a first code portion), and a second correspondence indicator may be applied to a dependent error (e.g., generated by evaluating a second code portion that receives input based on the first code portion). The different correspondence indicators may be provided using, for example, different colors, different line styles (e.g., solid, dashed, dotted, etc.), different markings (e.g., different numbers, letters, symbols, etc.), or the like.

In some implementations, client device 210 may store one or more configuration parameters (e.g., configuration parameter values) as a user preference, and may apply the stored configuration parameters based on receiving input identifying a user (e.g., when the user logs in to TCE 220, when TCE 220 is loaded on a same client device 210 where the configuration parameters are stored, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7I are diagrams of an example implementation 700 relating to example process 600 shown in FIG. 6. FIGS. 7A-7I show examples of modifying error information provided via a user interface based on different configuration parameters.

Figure 7A:
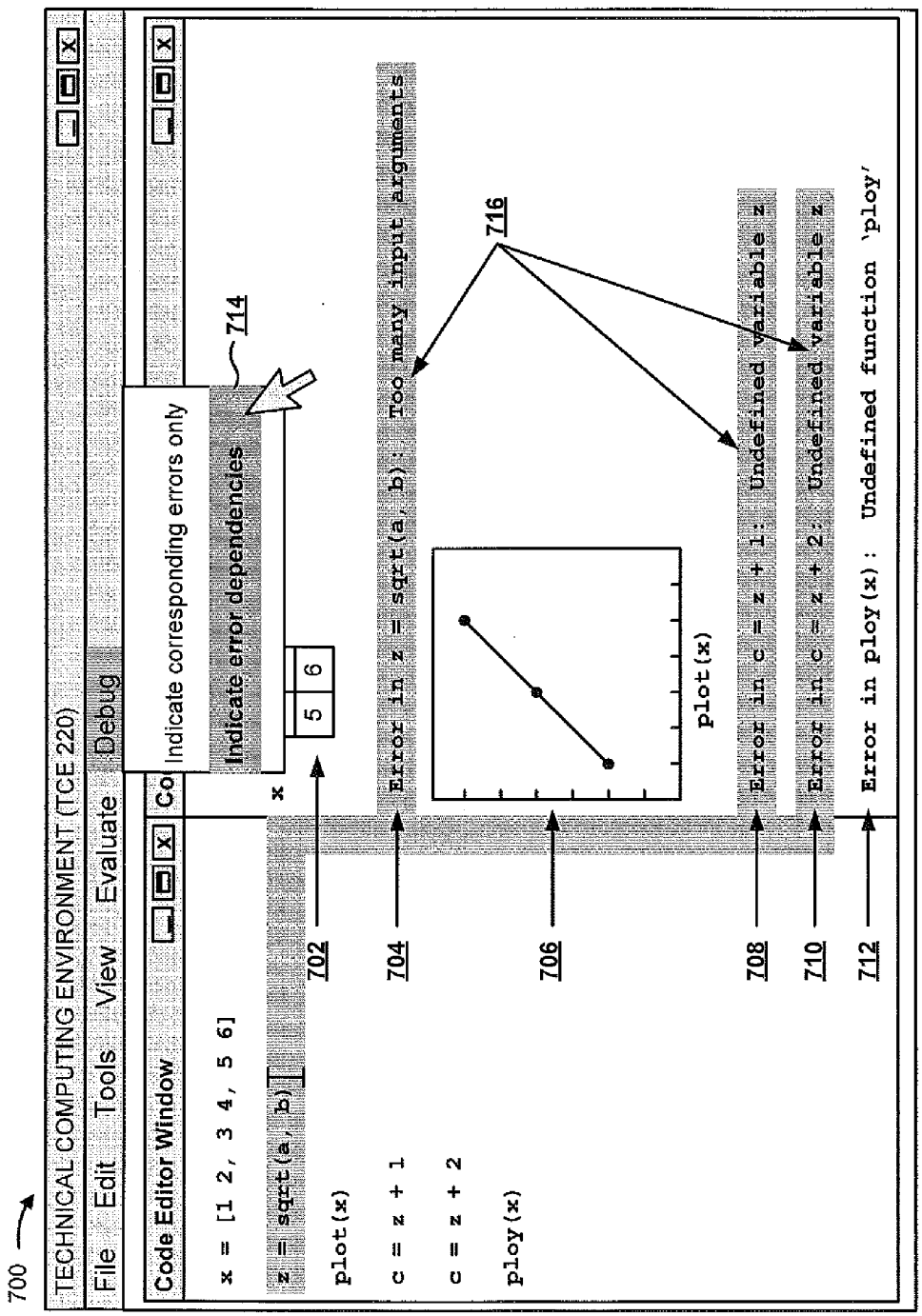

As shown in FIG. 7A, assume that a user has input the following program code into a code editor window of TCE 220:

x=[1 2, 3 4, 5 6]
z=sqrt(a, b)
plot(x)
c=z+1
c=z+2
ploy(x).

As further shown in FIG. 7A, assume that client device 210 has evaluated the program code to generate program code evaluation results corresponding to the evaluated program code. For example, assume that client device 210 evaluates the first line of program code, x=[1 2, 3 4, 5 6], to generate a three by two array stored using the variable x, and provides an error-free result 702 representing the three by two array stored in x, as shown. Further, assume that client device 210 evaluates the second line of program code, z=sqrt(a, b), and provides an error indicator 704 indicating that the second line of program code includes an error (e.g., "Error in z=sqrt(a, b): Too many input arguments"). Further, assume that client device 210 evaluates the third line of program code, plot(x), to generate a plot based on the three by two array stored in x, and provides an error-free result 706 representing the plot, as shown. Even though client device 210 encountered an error in the second line of program code, client device 210 continues to evaluate and execute the third line of program code.

Further, assume that client device 210 evaluates the fourth line of program code, c=z+1, and provides an error indicator 708 indicating that the fourth line of program code includes an error (e.g., "Error in c=z+1: Undefined variable z"). Further, assume that client device 210 evaluates the fifth line of program code, c=z+2, and provides an error indicator 710 indicating that the fifth line of program code includes an error (e.g., "Error in c=z+2: Undefined variable z"). Finally, assume that client device 210 evaluates the sixth line of program code, ploy(x), and provides an error indicator 712 indicating that the sixth line of program code includes an error (e.g., "Error in ploy(x): Undefined function 'ploy'").

As shown by reference number 714, assume that the user interacts with an input mechanism (e.g., a menu item) to provide an indication that client device 210 is to provide dependency indicators. Based on the user interaction, assume that client device 210 highlights errors that correspond to a selected line of program code (e.g., the second line of program code) and all errors that depend from the selected line of program code, as shown by reference number 716. As shown, client device 210 has highlighted error indicator 704 (e.g., which corresponds to the second line of program code), error indicator 708 (e.g., which depends from the second line of program code based on the shared variable z), and error indicator 710 (e.g., which depends from the second line of program code based on the shared variable z). As further shown, client device 210 has not highlighted error indicator 712 because error indicator 712 indicates an error that is independent of the second line of program code (e.g., does not share any variables, functions, etc.).

Figure 7B:
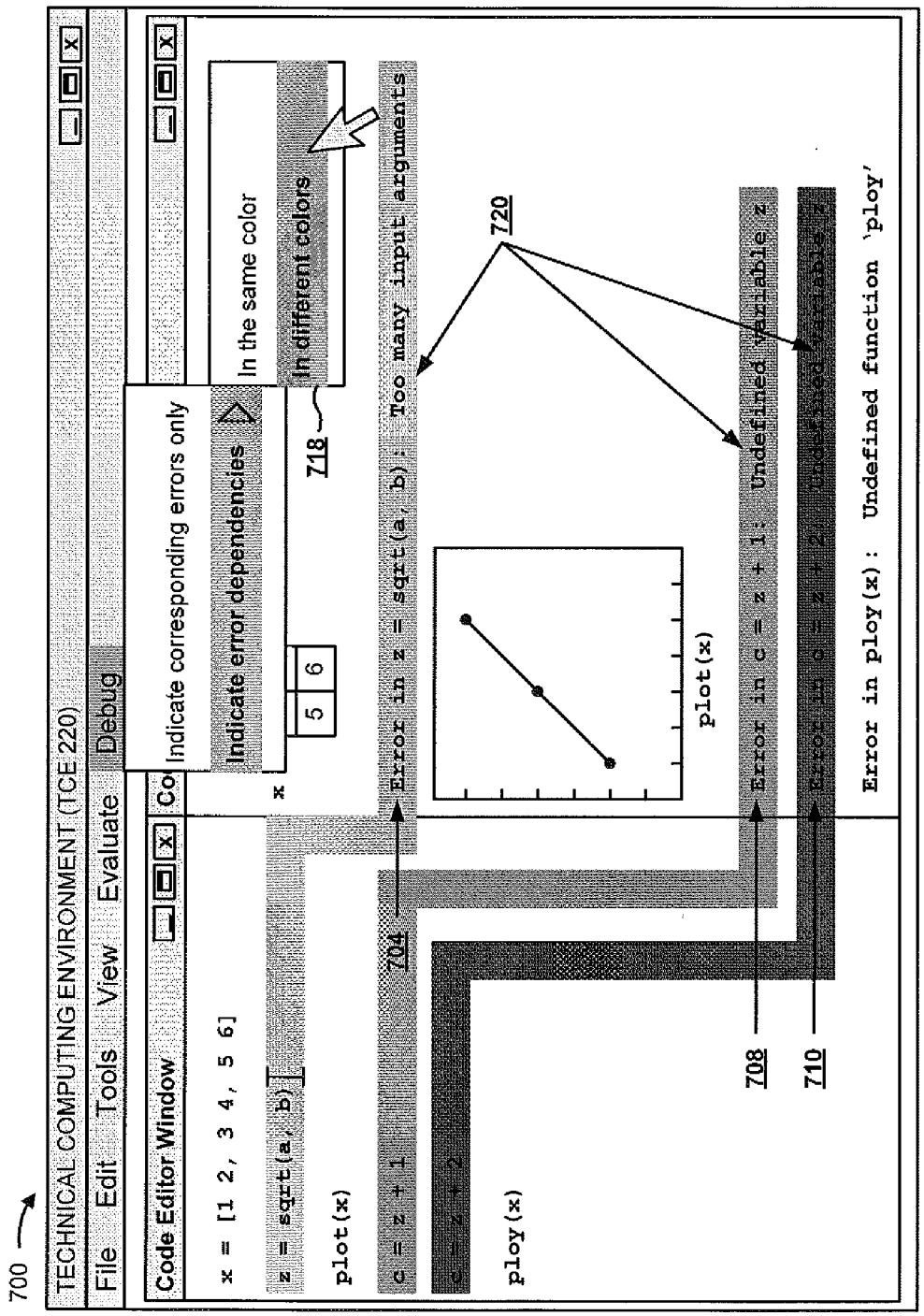

As shown in FIG. 7B, and by reference number 718, assume that the user interacts with an input mechanism (e.g., a menu item) to provide an indication that client device 210 is to provide dependency indicators and/or correspondence indicators using different colors. Based on the user interaction, assume that client device 210 highlights error indicators 704, 708, and 710 using different colors, as shown by reference number 720.

Figure 7C:
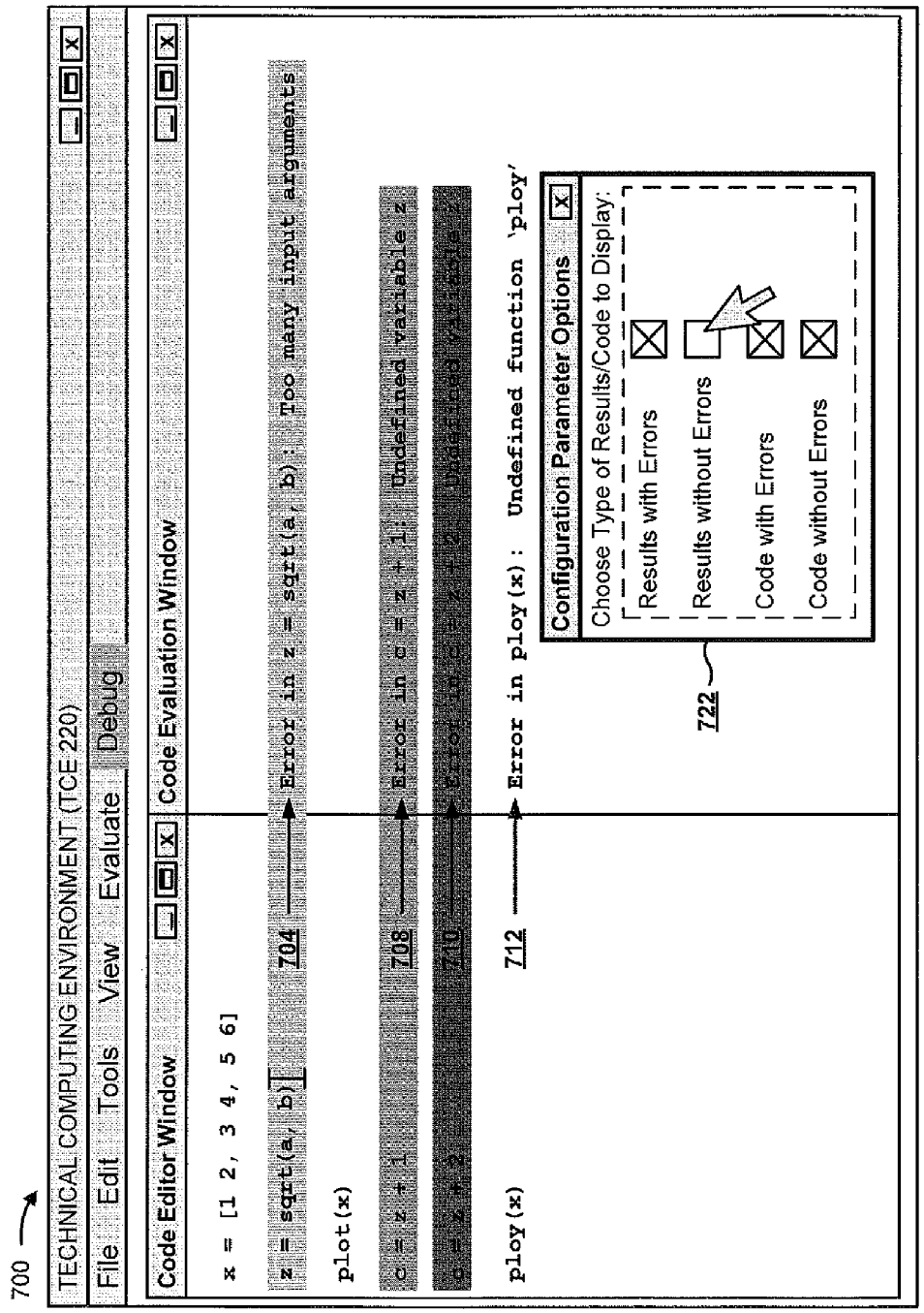

As shown in FIG. 7C, assume that the user interacts with TCE 220 to cause client device 210 to provide an input mechanism 722, which permits the user to adjust a configuration parameter that controls a type of result and a type of code to show or hide. As shown, assume that the user selects to show results with errors (e.g., error indicators), code that includes an error, and code that does not include an error. Further, assume that the user selects to hide results without errors (e.g., error-free results, or non-error indicators). Based on the user selections, client device 210 shows all program code in the code editor window, but only shows error indicators (e.g., error indicators 704, 708, 710, and 712) in the code evaluation window. Client device 210 hides error-free results 702 and 706 in the code evaluation window.

Figure 7D:
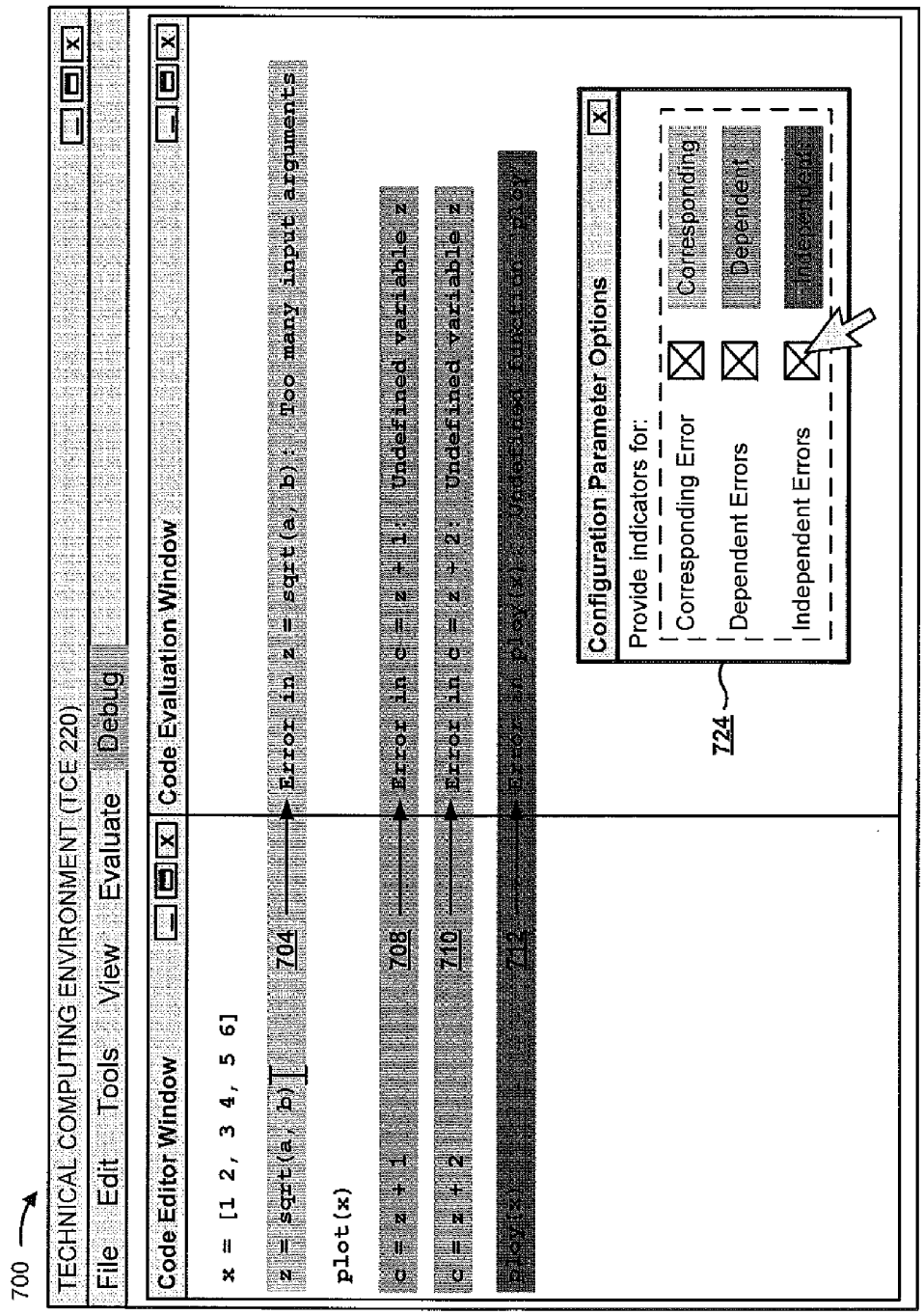

As shown in FIG. 7D, assume that the user interacts with TCE 220 to cause client device 210 to provide an input mechanism 724, which permits the user to adjust a configuration parameter that controls whether to show a correspondence indicator for different types of errors, and a style of a correspondence indicator to use for different types of errors (e.g., corresponding errors, dependent errors, and independent errors). As shown, assume that the user selects to show correspondence indicators for corresponding errors, dependent errors, and independent errors. Further, assume that the user selects to highlight corresponding errors (e.g., corresponding error indicators) using a light gray color, to highlight dependent errors using a medium gray color, and to highlight independent errors using a dark gray color.

As shown, based on the user interaction, client device 210 highlights error indicator 704 using a light gray color because error indicator 704 corresponds to the selected second line of program code (e.g., which may override an independent or dependent error indicator for the second line of program code), highlights error indicators 708 and 710 using a medium gray color because the errors indicated by error indicators 708 and 710 depend from the error in the selected second line of code, and highlights error indicator 712 using a dark gray color because the error indicated by error indicator 712 does not depend from (e.g., is independent of) the error in the selected second line of code. In some implementations, client device 210 may highlight a dependent error only if the dependent error depends from the selected line of code. Alternatively, client device 210 may highlight dependent errors that depend from a line of code other than the selected line of code (e.g., using a same color or a different color than errors that depend from the selected line of code).

Figure 7E:
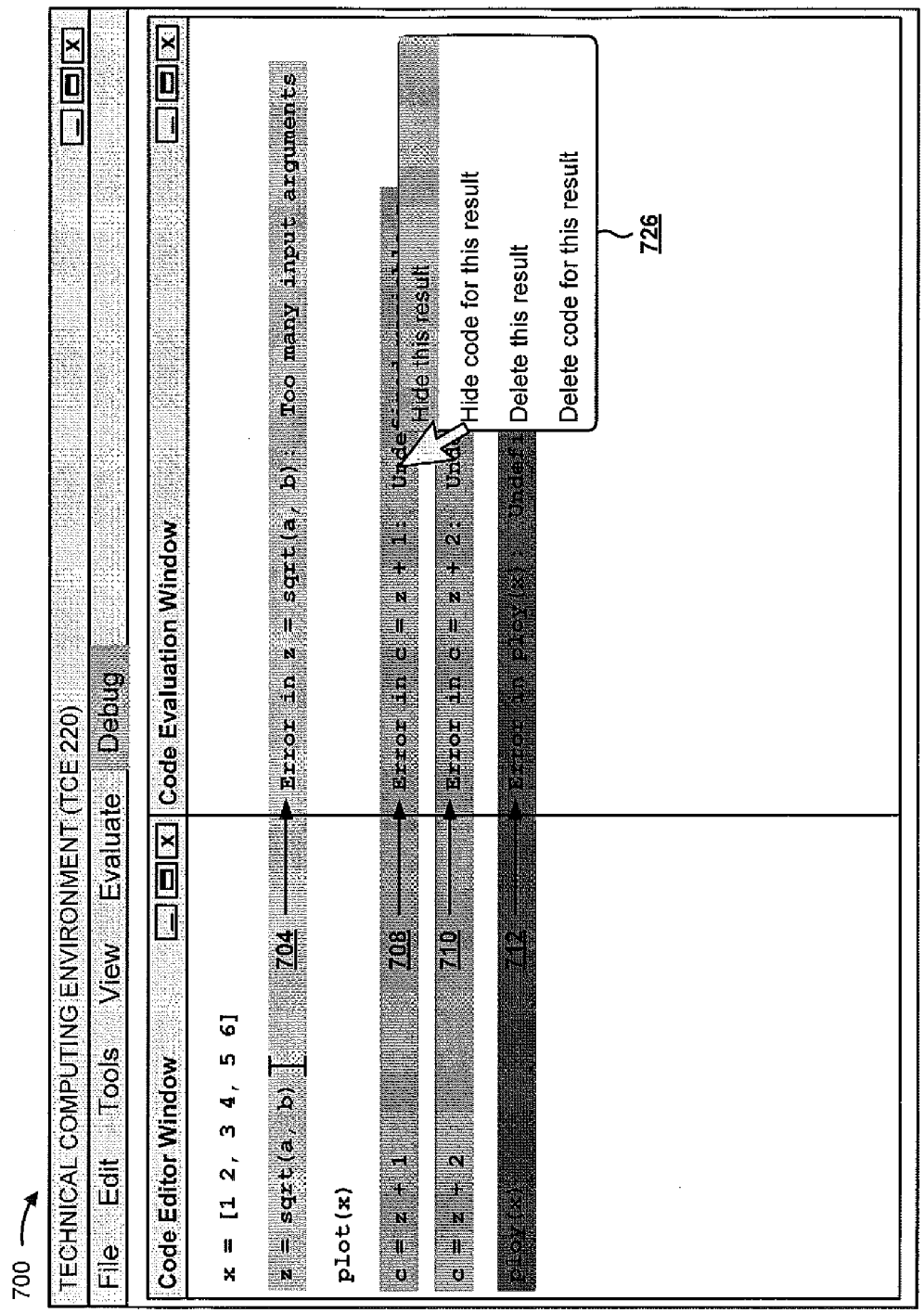
Figure 7F:
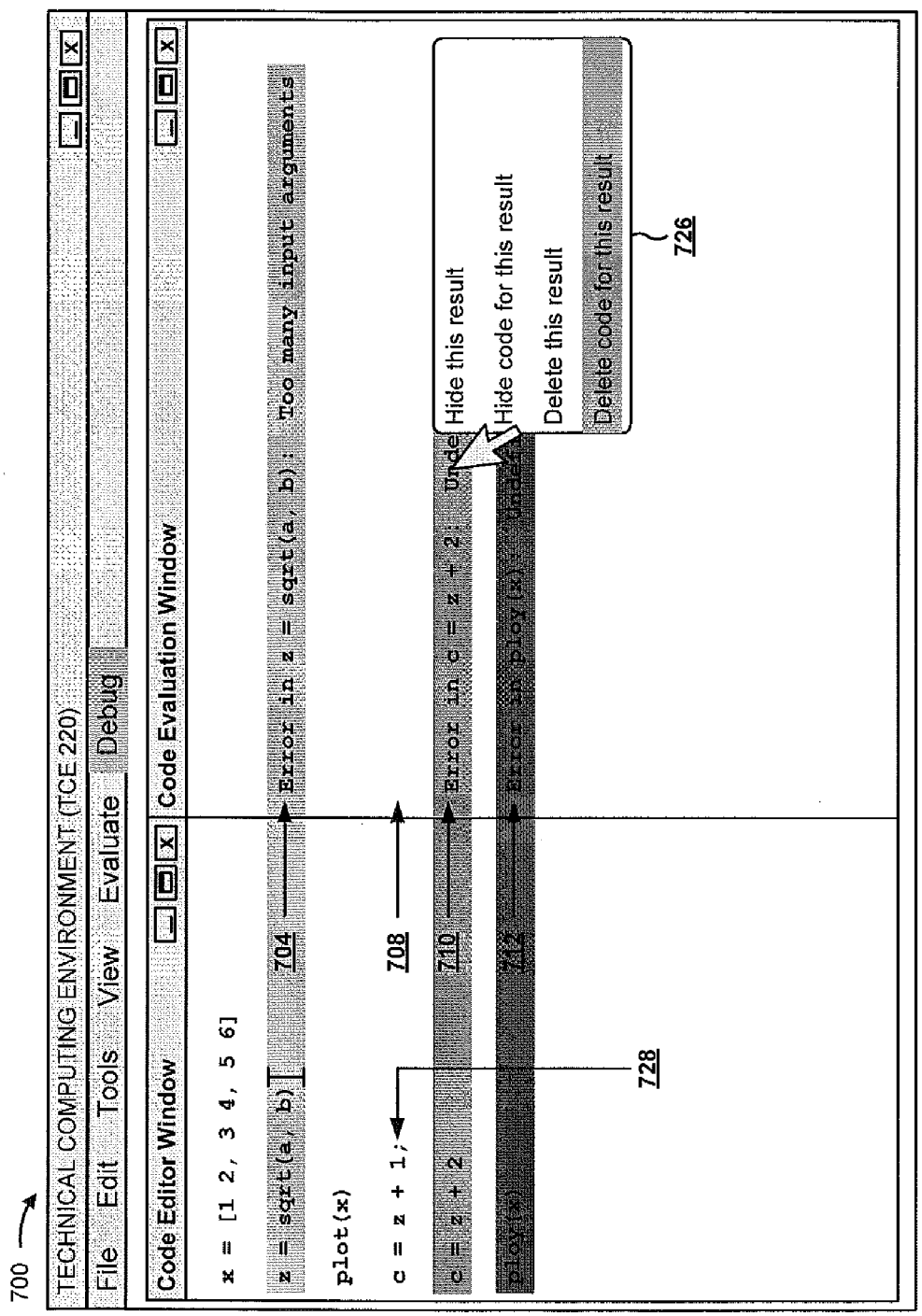

As shown in FIG. 7E, assume that the user interacts with error indictor 708 (e.g., by right-clicking on error indicator 708), and that client device 210 provides an input mechanism 726, which permits the user to adjust a configuration parameter that controls whether to hide or delete error indicator 708 and/or code associated with error indicator 708. Assume that the user selects to hide error indicator 708. As shown in FIG. 7F, client device 210 has hidden error indicator 708 and the correspondence indicator associated with error indicator 708 based on the user selection. However, client device 210 continues to show the fourth line of program code, which corresponds to error indicator 708 (e.g., c=z+1). As shown by reference number 728, client device 210 has inserted a semicolon at the end of the fourth line of program code to indicate that the result (e.g., the error indicator) has been suppressed (e.g., hidden in the code evaluation window).

As further shown in FIG. 7F, assume that the user interacts with error indictor 710 (e.g., by right-clicking on error indicator 710), and that client device 210 provides input mechanism 726. Assume that the user selects to delete program code corresponding to error indicator 710, as shown. As shown in FIG. 7G, and by reference number 730, client device 210 has deleted the program code corresponding to error indicator 710 (e.g., c=z+2), and has also deleted error indicator 710 and the correspondence indicator associated with error indicator 710.

Figure 7H:
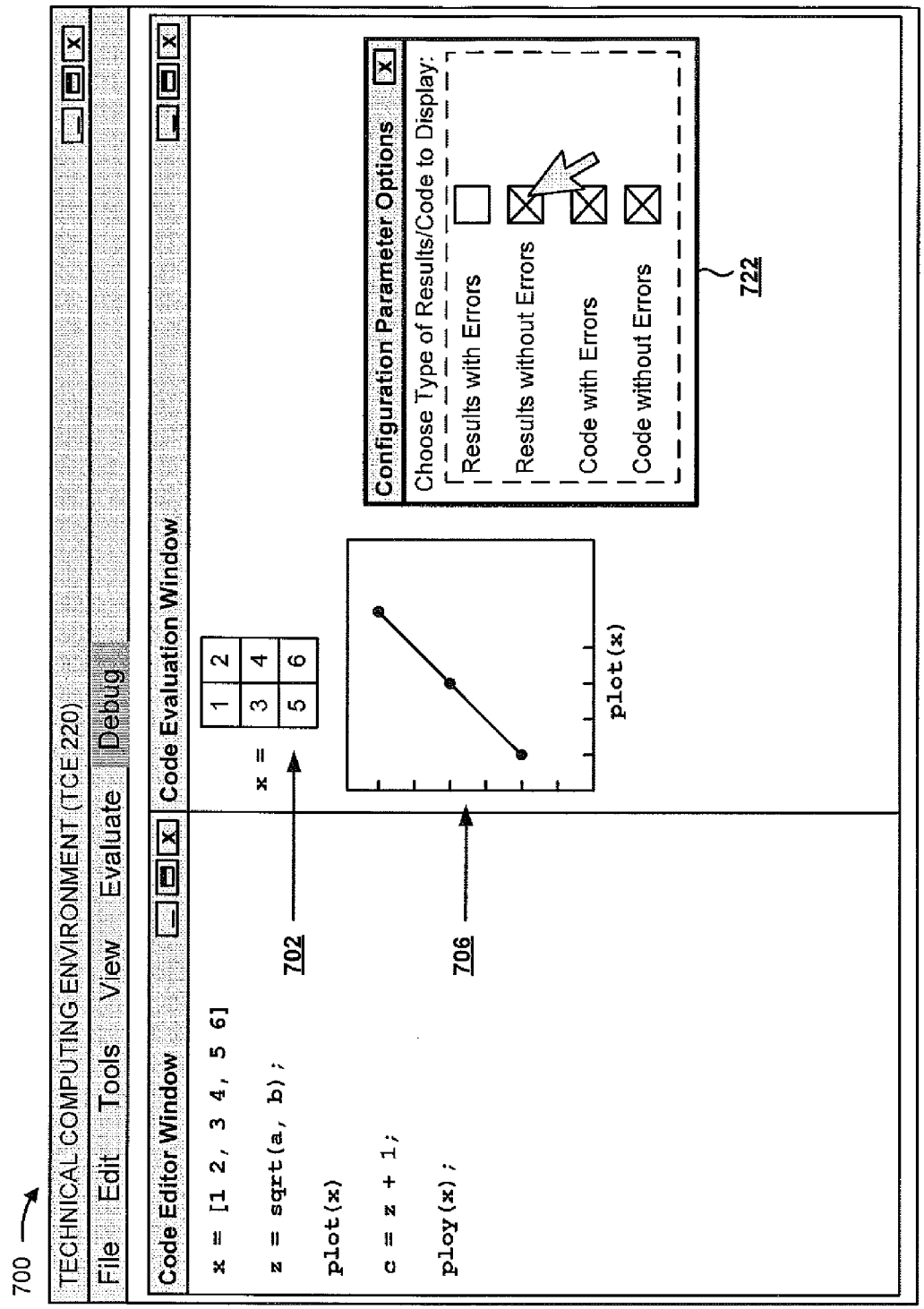

As shown in FIG. 7H, assume that the user interacts with TCE 220 to cause client device 210 to provide input mechanism 722, which permits the user to adjust a configuration parameter that controls a type of result and a type of code to show or hide. As shown, assume that the user selects to show results without errors, code that includes an error, and code that does not include an error. Further, assume that the user selects to hide results containing errors. Based on the user selections, client device 210 shows all program code in the code editor window, but only shows error-free results 702 and 706 in the code evaluation window because results 702 and 706 are not associated with errors (e.g., are generated based on executing program code that executed properly).

Figure 7I:
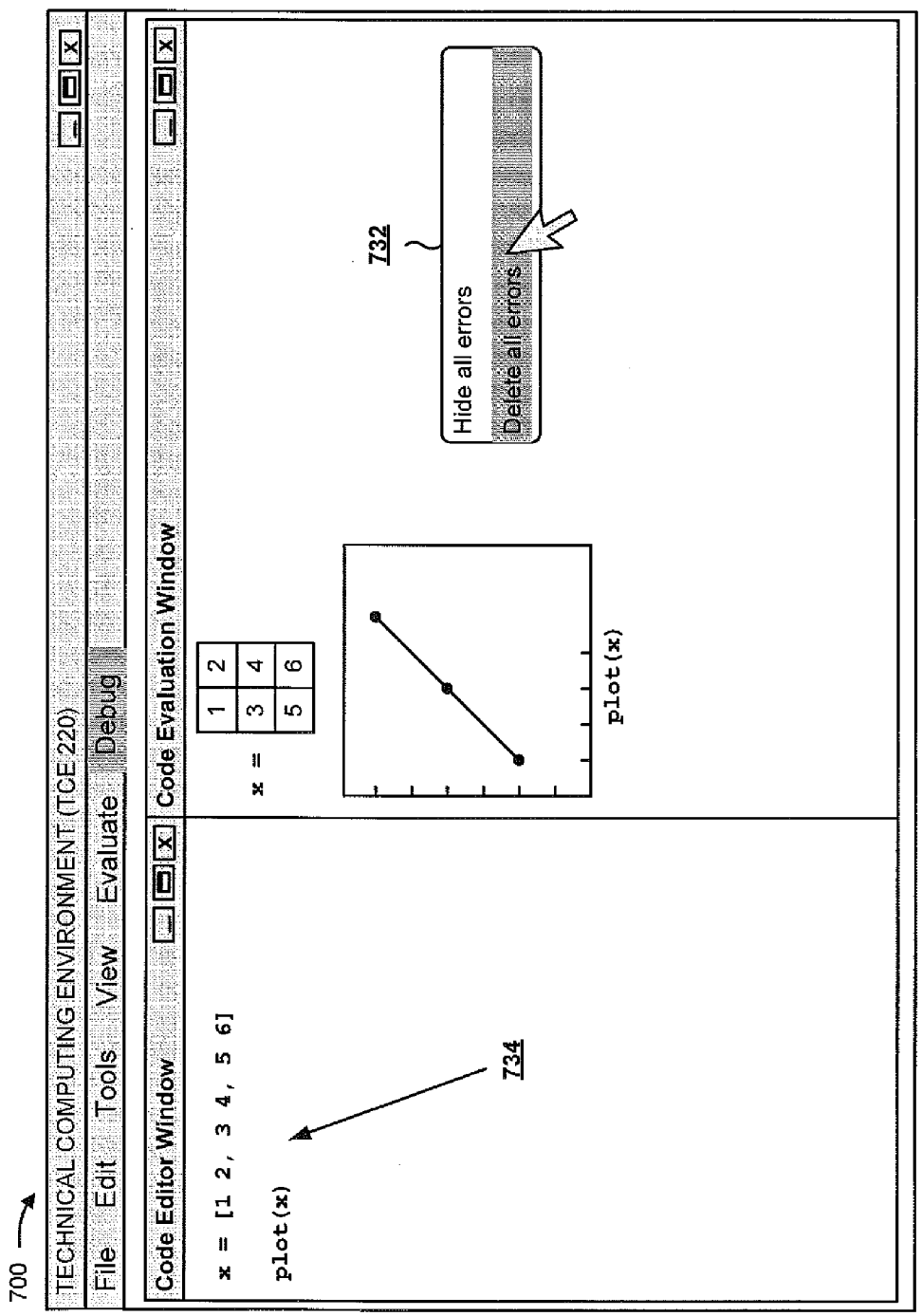

As shown in FIG. 7I, assume that the user interacts with TCE 220 to cause client device 210 to provide an input mechanism 732, which permits the user to adjust a configuration parameter that controls whether to show, hide, or delete errors. Assume that the user selects to delete all errors. As shown by reference number 734, based on the user selection, client device 210 has deleted all program code that includes errors from the program code provided via the code editor window.

As indicated above, FIGS. 7A-7I are provided merely as an example. Other examples are possible and may differ from what was described with regard to FIGS. 7A-7I.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive an indication to evaluate a plurality of portions of program code provided in a first portion of a user interface;
      cause a first portion of program code, of the plurality of portions of program code, to be evaluated for debugging purposes, based on receiving the indication to evaluate the plurality of portions of program code;
      determine a corresponding error, associated with the first portion of program code, based on causing the first portion of program code to be evaluated;
      provide an error indicator, that identifies the corresponding error, in a second portion of the user interface based on determining the error,
         the second portion of the user interface being different from the first portion of the user interface;
      cause a second portion of program code, of the plurality of portions of program code, to be evaluated,
         the second portion of program code being evaluated after determining the error associated with the first portion of program code;
      determine a result, associated with the second portion of program code, based on causing the second portion of program code to be evaluated; and
      provide the result for display based on determining the result.

2. The device of claim 1, where the one or more processors are further to:
   provide suggested program code associated with the first portion of program code;
   provide a valid result of evaluating the suggested portion of program code;
   receive input identifying the suggested portion of program code or the valid result; and
   replace, in the first portion of the user interface, the first portion of program code with the suggested portion of program code based on the input identifying the suggested portion of program code or the valid result.

3. The device of claim 1, where the one or more processors, when determining the result, are further to:
   determine an error-free result based on causing the second portion of program code to be evaluated; and
   where the one or more processors, when providing the result, are further to:
      provide the error-free result based on determining the error-free result.

4. The device of claim 1, where the one or more processors, when determining the result, are further to:
   determine an independent error associated with the second portion of program code based on causing the second portion of program code to be evaluated,
      the independent error being independent of the corresponding error and the first portion of program code; and
   where the one or more processors, when providing the result, are further to:
      provide another error indicator that identifies the independent error.

5. The device of claim 4, where the one or more processors are further to:
   receive a selection of the first portion of program code;
   provide a first correspondence indicator that indicates a correspondence between the error indicator and the first portion of program code based on receiving the selection of the first portion of program code;
   provide a second correspondence indicator that indicates a correspondence between the other error indicator and the second portion of program code based on receiving the selection of the first portion of program code,
      the second correspondence indicator being different from the first correspondence indicator.

6. The device of claim 1, where the one or more processors, when determining the result, are further to:
   determine a dependent error associated with the second portion of program code based on causing the second portion of program code to be evaluated,
      the dependent error being dependent on the corresponding error or the first portion of program code; and
   where the one or more processors, when providing the result, are further to:
      provide another error indicator that identifies the dependent error.

7. The device of claim 6, where the one or more processors are further to:
   receive a selection of the first portion of program code; and
   provide a correspondence indicator that indicates a correspondence between the error indicator, the other error indicator, and the first portion of program code based on receiving the selection of the first portion of program code.

8. A computer-readable medium storing instructions, the instructions comprising:
   one or more instructions that, when executed by one or more processors, cause the one or more processors to:
      receive an indication to evaluate a first portion of program code and a second portion of program code provided via a user interface,
         the first portion of program code including an error;
      cause the first portion of program code to be evaluated, to determine a first result, based on receiving the indication, the first result including an error indicator associated with the error;
cause the second portion of program code to be evaluated, to determine a second result, based on receiving the indication,
the second portion of program code being evaluated after the first portion of program code is evaluated; and
provide the first result, including the error indicator, and the second result via the user interface.

9. The computer-readable medium of claim 8, where the first portion of program code and the second portion of program code are provided in a first section of the user interface; and
where the one or more instructions, that cause the one or more processors to provide the first result and the second result, further cause the one or more processors to:
provide the first result and the second result in a second section of the user interface,
the second section being separate from the first section.

10. The computer-readable medium of claim 8, where the error indicator is a first error indicator, and where the second result includes a second error indicator; and
where the one or more instructions, when executed by the one or more processors, further cause the one or more processors to:
determine that the second portion of program code depends from the first portion of program code; and
provide a correspondence indicator that indicates a correspondence between the first portion of program code, the first error indicator, and the second error indicator based on determining that the second portion of program code depends from the first portion of program code.

11. The computer-readable medium of claim 8, where the error indicator is a first error indicator, and where the second result includes a second error indicator; and
where the one or more instructions, when executed by the one or more processors, further cause the one or more processors to:
determine that the first portion of program code is associated with a first error type;
determine that the second portion of program code is associated with a second error type that is different from the first error type;
provide a first correspondence indicator that indicates a correspondence between the first portion of program code and the first error indicator; and
provide a second correspondence indicator that indicates a correspondence between the second portion of program code and the second error indicator based on determining that the second portion of program code is associated with a second error type that is different from the first error type,
the second correspondence indicator being different from the first correspondence indicator.

12. The computer-readable medium of claim 8, where the second result includes an error-free result; and
where the one or more instructions, when executed by the one or more processors, further cause the one or more processors to:
receive an indication to hide error-free results; and
hide the second result based on receiving the indication to hide error-free result.

13. The computer-readable medium of claim 8, where the one or more instructions, when executed by the one or more processors, further cause the one or more processors to:
receive an indication to hide results associated with errors; and
hide the first result based on receiving the indication to hide results associated with errors.

14. The computer-readable medium of claim 8, where the one or more instructions, when executed by the one or more processors, further cause the one or more processors to:
receive an indication to delete errors; and
delete the first portion of program code and the first result based on receiving the indication to delete errors.

15. A method, comprising:
evaluating first program code, provided via a user interface, to determine whether the first program code is associated with an error,
the evaluating the first program code being performed by one or more devices;
determining, based on evaluating the first program code, that the first program code is associated with the error,
the determining being performed by the one or more devices;
generating a first result that includes an error indicator based on determining that the first program code is associated with the error,
the generating the first result being performed by the one or more devices;
evaluating second program code, provided via the user interface, to generate a second result associated with the second program code,
the second program code being evaluated after the first program code is evaluated,
the evaluating the second program code being performed by the one or more devices;
generating the second result based on evaluating the second program code,
the generating the second result being performed by the one or more devices;
providing the first result in the user interface based on generating the first result,
the providing the first result being performed by the one or more devices; and
providing the second result in the user interface based on generating the second result,
the providing the second result being performed by the one or more devices.

16. The method of claim 15, further comprising:
receiving information identifying the first program code; and
providing, via the user interface, a correspondence indicator that indicates an association between the first result and the first program code based on receiving the information identifying the first program code.

17. The method of claim 15, where the error is a first error, and where the error indicator is a first error indicator; and
where generating the second result further comprises:
determining, based on evaluating the second program code, that the second program code is associated with a second error;
generating the second result that includes a second error indicator based on determining that the second program code is associated with the second error; and
where the method further comprises:
receiving a selection of the first program code;
determining that the second error is dependent on the first error; and
providing, based on receiving the selection of the first program code and based on determining that the second error is dependent on the first error, a correspondence indicator that indicates a correspondence between the first program code, the first result, and the second result.

18. The method of claim 15, where the error is as first error, and where the error indicator is a first error indicator; and where generating the second result further comprises:
   determining, based on evaluating the second program code, that the second program code is associated with a second error;
   generating the second result that includes a second error indicator based on determining that the second program code is associated with the second error; and
where the method further comprises:
   receiving a selection of the first program code;
   determining that the second error is independent of the first error;
   providing, based on receiving the selection of the first program code, a first correspondence indicator that indicates a correspondence between the first program code and the first result; and
   providing, based on receiving the selection of the first program code and based on determining that the second error is independent of the first error, a second correspondence indicator that indicates a correspondence between the second program code and the second result.

19. The method of claim 15, where generating the second result further comprises:
   determining that the second result includes an error-free result;
   generating the error-free result; and
   where providing the second result further comprises:
      providing the error-free result based on generating the error-free result.

20. The method of claim 15, further comprising:
   receiving an indication to hide results associated with errors;
   hiding the first result based on receiving the indication to hide results associated with errors; and
   modifying the first program code based on receiving the indication to hide results associated with errors.

* * * * *